United States Patent
Aufderhar et al.

(10) Patent No.: US 11,557,994 B2
(45) Date of Patent: Jan. 17, 2023

(54) POWER SYSTEM SEQUENCING SCHEME FOR ANY ARBITRARY TOPOLOGY

(71) Applicant: Cummins Power Generation Inc., Minneapolis, MN (US)

(72) Inventors: Kevin J. Aufderhar, Minneapolis, MN (US); Paul R. Dahlen, Grant, MN (US); Dennis G. McDonald, Golden Valley, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/155,278

(22) Filed: Jan. 22, 2021

(65) Prior Publication Data

US 2021/0234486 A1 Jul. 29, 2021

Related U.S. Application Data

(60) Provisional application No. 62/965,459, filed on Jan. 24, 2020.

(51) Int. Cl.
*H02P 9/02* (2006.01)
*H02J 4/00* (2006.01)

(52) U.S. Cl.
CPC . *H02P 9/02* (2013.01); *H02J 4/00* (2013.01)

(58) Field of Classification Search
CPC ..................................... H02P 9/02; H02J 4/00
See application file for complete search history.

(56) References Cited

U.S. PATENT DOCUMENTS

| | | |
|---|---|---|
| 6,522,030 B1 | 2/2003 | Wall et al. |
| 7,301,971 B2 | 11/2007 | Link et al. |
| 7,612,466 B2 | 11/2009 | Skutt |
| 9,256,905 B2 | 2/2016 | Mashinsky et al. |
| 2002/0038379 A1 | 3/2002 | Sato et al. |
| 2007/0121265 A1 | 5/2007 | Hill et al. |
| 2010/0204851 A1 | 8/2010 | Yuen et al. |
| 2012/0049638 A1 | 3/2012 | Dorn et al. |

(Continued)

FOREIGN PATENT DOCUMENTS

| | | |
|---|---|---|
| EP | 2 398 128 A2 | 12/2011 |
| EP | 2 887 537 A2 | 6/2015 |

OTHER PUBLICATIONS

International Search Report and Written Opinion Received for PCT application No. PCT/US2021/014513, dated May 3, 2021, 14 pages.

(Continued)

*Primary Examiner* — Sean Gugger
(74) *Attorney, Agent, or Firm* — Foley & Lardner LLP

(57) ABSTRACT

Systems and apparatuses include a circuit structured to: identify a first source object, a second source object, and a load bus object; determine locations of the first source object, the second source object, and the load bus object on a one-line topology; receive operational parameters of the first source object, the second source object, and the load bus object; define, using the one-line topology, a first route including objects electrically connected between the first source object and the load bus object; define, using the one-line topology, a second route including all objects electrically connected between the second source object and the load bus object; and control operation of the first route and the second route.

22 Claims, 16 Drawing Sheets

(56) References Cited

U.S. PATENT DOCUMENTS

| | | | |
|---|---|---|---|
| 2013/0069437 A1* | 3/2013 | Biallas | H04L 12/413 |
| | | | 307/80 |
| 2016/0254667 A1 | 9/2016 | Lee | |
| 2017/0012439 A1 | 1/2017 | Zhang et al. | |
| 2018/0109110 A1 | 4/2018 | Gerdes et al. | |
| 2019/0109891 A1 | 4/2019 | Paruchuri et al. | |

OTHER PUBLICATIONS

International Search Report and Written Opinion received for PCT application No. PCT/US2021/014515, dated May 6, 2021, 15 pages.
International Search Report and Written Opinion Received for PCT application No. PCT/US2021/014523, dated Jun. 1, 2021, 24 pages.
Momoh, James A. "Distribution Management Systems", Electric Power Distribution, Automation, Protection, and Control, Taylor and Francis Group 2007. pp. 259-275.
Vaahedi, Ebrahim. "Energy management systems", Practical Power System Operation, First Edition. The Institute of Electrical and Electronics Engineers, Inc. pp. 161-175. 2014.
Fang et al., "Smart Grid—The New and Improved Power Grid: A Survey," IEEE Communications Surveys & Tutorials, 2012, vol. 14, No. 4, pp. 944-980.
Xu et al., "Energy Router: Architectures and Functionalities toward Energy Internet," IEEE International Conference on Smart Grid Communications (SmartGridComm), Brussels, 2011, pp. 31-36.
Zhu et al., "A Secure Energy Routing Mechanism for Sharing Renewable Energy in Smart Microgrid," 2011 IEEE International Conference on Smart Grid Communications (SmartGridComm), Brussels, 2011, pp. 143-148.
Notice of Allowance on U.S. Appl. No. 17/155,288, dated Dec. 7, 2022, 8 pages.

* cited by examiner

| | OBJECT ID | OBJECT NAME | OBJECT TYPE | OBJECT SUBTYPE |
|---|---|---|---|---|
| 34 | 1 | U1 | SOURCE | UTILITY |
| 42 | 2 | G1 | SOURCE | GENSET |
| 50 | 3 | SWU1 | SWITCH | SOURCE SWITCH |
| 54 | 4 | SWG1 | SWITCH | SOURCE SWITCH |
| 62 | 5 | LB1 | BUS | LOAD BUS |
| 38 | 6 | BU1 | BUS | BUS |
| 46 | 7 | BG1 | BUS | BUS |
| 58 | 8 | L1 | LOAD | GENERAL LOAD |
| 66 | 9 | C1 | CONTROLLER | CONTROLLER |
| 70 | 10 | C2 | CONTROLLER | CONTROLLER |

| | OBJECT ID | OBJECT NAME | OBJECT TYPE | OBJECT SUBTYPE |
|---|---|---|---|---|
| 194 | 1 | U1 | SOURCE | UTILITY |
| 198 | 2 | G1 | SOURCE | GENSET |
| 202 | 3 | G2 | SOURCE | GENSET |
| 206 | 4 | G3 | SOURCE | GENSET |
| 210 | 5 | SWU1 | SWITCH | SOURCE SWITCH |
| 214 | 6 | SWG1 | SWITCH | SOURCE SWITCH |
| 218 | 7 | SWG2 | SWITCH | SOURCE SWITCH |
| 222 | 8 | SWG3 | SWITCH | SOURCE SWITCH |
| 226 | 9 | SW4 | SWITCH | SOURCE SWITCH |
| 230 | 10 | F1 | SWITCH | LOAD SWITCH |
| 234 | 11 | F2 | SWITCH | LOAD SWITCH |
| 238 | 12 | F3 | SWITCH | LOAD SWITCH |
| 242 | 13 | F4 | SWITCH | LOAD SWITCH |
| 246 | 14 | X1 | TRANSFORMER | TRANSFORMER |
| 250 | 15 | B1 | BUS | BUS |
| 254 | 16 | B2 | BUS | BUS |
| 258 | 17 | LB1 | BUS | LOAD BUS |
| 262 | 18 | BU1 | BUS | BUS |
| 266 | 19 | BG1 | BUS | BUS |
| 270 | 20 | BG2 | BUS | BUS |
| 274 | 21 | BG3 | BUS | BUS |
| 278 | 22 | BL1 | BUS | BUS |
| 282 | 23 | BL2 | BUS | BUS |
| 286 | 24 | BL3 | BUS | BUS |
| 290 | 25 | BL4 | BUS | BUS |
| 294 | 26 | C1 | CONTROLLER | CONTROLLER |
| 298 | 27 | C2 | CONTROLLER | CONTROLLER |
| 302 | 28 | C3 | CONTROLLER | CONTROLLER |
| 306 | 29 | C4 | CONTROLLER | CONTROLLER |
| 310 | 30 | C5 | CONTROLLER | CONTROLLER |
| 314 | 31 | C6 | CONTROLLER | CONTROLLER |

*FIG. 5*

| ENABLE | ROUTE ID | ROUTE PRIORITY | ROUTE PATH |
|---|---|---|---|
| Y | LB1.G1 | 1 | LB1-SW4-B1-SWG1-G1 |
| Y | LB1.G2 | 1 | LB1-SW4-B1-SWG2-G2 |
| Y | LB1.G3 | 1 | LB1-SW4-B1-SWG3-G3 |
| Y | LB1.U1 | 1 | LB1-SWU1-U1 |

| ENABLE | ROUTE ID | ROUTE PRIORITY | ROUTE PATH |
|---|---|---|---|
| Y | R1.1 | 1 | LB1-SM1-SB1-52S1-S1 |
| Y | R1.2 | 1 | LB1-SM1-SB1-52S2-S2 |
| Y | R1.3 | 1 | LB1-SM1-SB1-52S3-S3 |
| Y | R1.4 | 1 | LB1-52S4-S4 |
| Y | R1.5 | 1 | LB1-52S5-S5 |
| Y | R1.6 | 1 | LB1-UM1-U1 |
| Y | R1.7 | 2 | LB1-SM1-SB1-SM2-LB2-UM2-U2 |
| Y | R1.8 | 1 | LB1-T1-LB2-UM2-U2 |
| Y | R1.9 | 2 | LB1-T1-LB2-SM2-SB1-52S1-S1 |
| Y | R1.10 | 2 | LB1-T1-LB2-SM2-SB1-52S2-S2 |
| Y | R1.11 | 2 | LB1-T1-LB2-SM2-SB1-52S3-S3 |
| Y | R2.1 | 1 | LB2-SM2-SB1-52S1-S1 |
| Y | R2.2 | 1 | LB2-SM2-SB1-52S2-S2 |
| Y | R2.3 | 1 | LB2-SM2-SB1-52S3-S3 |
| Y | R2.4 | 1 | LB2-T1-LB1-52S4-S4 |
| Y | R2.5 | 1 | LB2-T1-LB1-52S5-S5 |
| Y | R2.6 | 1 | LB2-T1-LB1-UM1-U1 |
| Y | R2.7 | 1 | LB2-UM2-U2 |
| Y | R2.8 | 2 | LB2-T1-LB1-SM1-SB1-52S1-S1 |
| Y | R2.9 | 2 | LB2-T1-LB1-SM1-SB1-52S2-S2 |
| Y | R2.10 | 2 | LB2-T1-LB1-SM1-SB1-52S3-S3 |
| Y | R2.11 | 2 | LB2-SM2-SB1-SM1-LB1-52S4-S4 |
| Y | R2.12 | 2 | LB2-SM2-SB1-SM1-LB1-52S5-S5 |
| Y | R2.13 | 2 | LB2-SM2-SB1-SM1-LB1-UM1-U1 |

*FIG. 8*

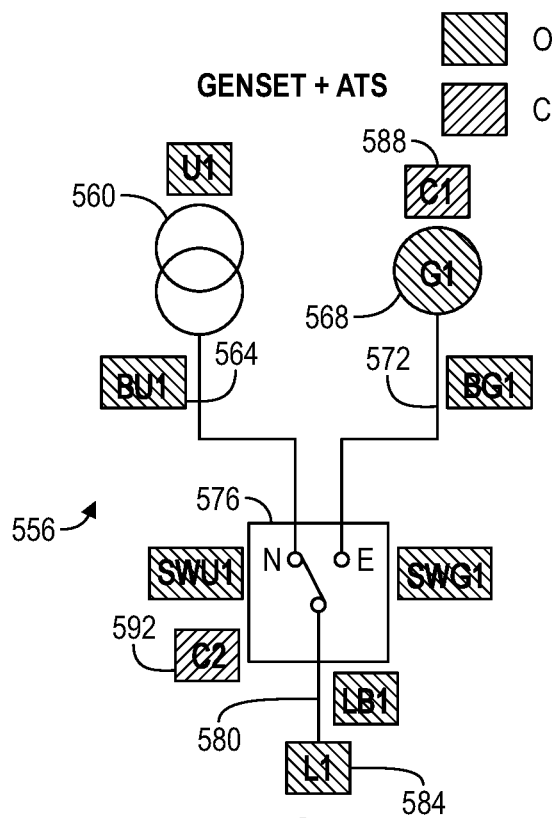
FIG. 11
|  | ALLOCATION | |
|---|---|---|
| OBJECT | C1 | C2 |
| U1 |  | X |
| G1 | X |  |
| SWU1 |  | X |
| SWG1 |  | X |
| LB1 |  | X |
| BU1 |  | X |
| BG1 | X | X |
| L1 |  | X |
FIG. 12
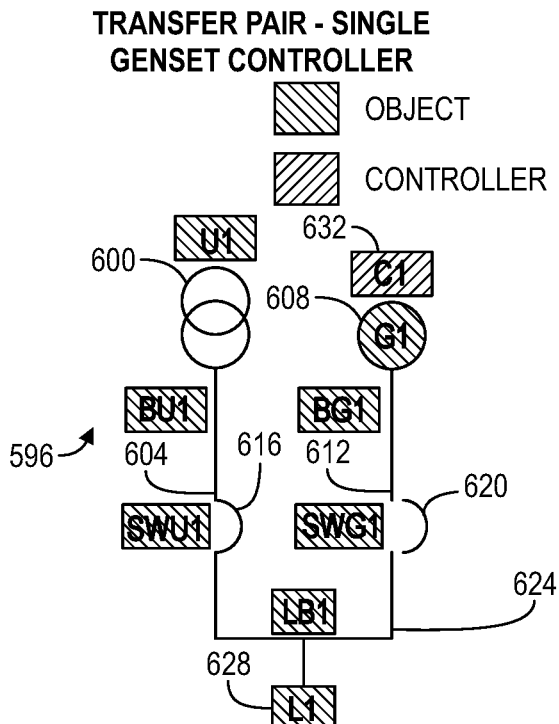
FIG. 13
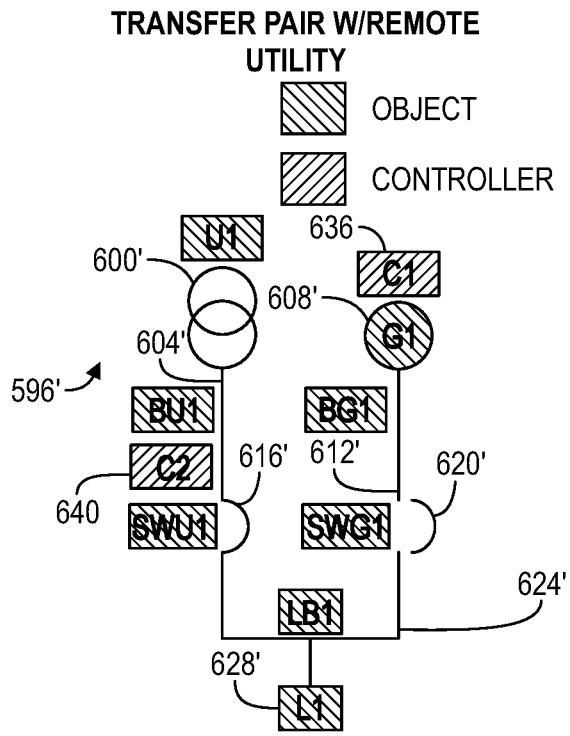
FIG. 14

| SCENARIO → | FIG. 13 | FIG. 14 | | FIG. 15 | | |
|---|---|---|---|---|---|---|
| OBJECT | C1 | C1 | C2 | C1 | C2 | C3 |
| U1 | X | | X | | X | |
| G1 | X | X | | X | | |
| SWU1 | X | | X | | X | |
| SWG1 | X | X | | | | X |
| LB1 | X | X | X | | X | X |
| BU1 | X | | X | | X | |
| BG1 | X | X | | X | | X |
| L1 | X | X | X | | X | X |

| | OBJECT | C1 | C2 | C3 | C4 | C5 | C6 |
|---|---|---|---|---|---|---|---|
| 194' | U1 | | | | X | | |
| 198' | G1 | X | | | | | |
| 202' | G2 | | X | | | | |
| 206' | G3 | | | X | | | |
| 210' | SWU1 | | | | X | | |
| 214' | SWG1 | X | | | | | |
| 218' | SWG2 | | X | | | | |
| 222' | SWG3 | | | X | | | |
| 226' | SW4 | | | | | X | |
| 230' | F1 | | | | | | X |
| 234' | F2 | | | | | | X |
| 238' | F3 | | | | | | X |
| 242' | F4 | | | | | | X |
| 246' | X1 | | | X | | | |
| 250' | B1 | X | X | X | | X | |
| 254' | B2 | | | X | | | |
| 258' | LB1 | | | | X | X | X |
| 262' | BU1 | | | | X | | |
| 266' | BG1 | X | | | | | |
| 270' | BG2 | | X | | | | |
| 274' | BG3 | | | X | | | |
| 278' | BL1 | | | | | | X |
| 282' | BL2 | | | | | | X |
| 286' | BL3 | | | | | | X |
| 290' | BL4 | | | | | | X |
| 318' | L1 | | | | | | X |
| 322' | L2 | | | | | | X |
| 326' | L3 | | | | | | X |
| 330' | L4 | | | | | | X |

*FIG. 18*

FLOATING PRINCIPAL CONTROL

POWER SYSTEM SEQUENCING SCHEME FOR ANY ARBITRARY TOPOLOGY

CROSS REFERENCE TO RELATED APPLICATIONS

This application claims the benefit of priority U.S. Provisional Patent Application No. 62/965,459, filed on Jan. 24, 2020, the entire contents of which are incorporated by reference herein.

BACKGROUND

The present disclosure relates to power systems. More particularly, the present disclosure relates to systems and methods for providing coordinated control of machines and components within a power system.

SUMMARY

One embodiment relates to an apparatus that includes a circuit structured to: identify a first source object, a second source object, and a load bus object; determine locations of the first source object, the second source object, and the load bus object on a one-line topology; receive operational parameters of the first source object, the second source object, and the load bus object; define, using the one-line topology, a first route including objects electrically connected between the first source object and the load bus object; define, using the one-line topology, a second route including all objects electrically connected between the second source object and the load bus object; and control operation of the first route and the second route.

In some embodiments, the circuit is further structured to generate a route table including all available routes.

In some embodiments, control of the first route includes selectively activating the first route by controlling closing actions of switch objects included on the first route, and deactivating the first route by controlling opening actions of at least one switch object on the first route. In some embodiments, activating the first route includes communicating with all objects on the first route and coordinating activation actions of each object before initiating the closing actions of the switch objects included on the first route.

In some embodiments, defining the first route includes communication with all the objects electrically connected between the first source object and the load bus object to define inclusion on the first route within an associated control circuit.

In some embodiments, the circuit is further structured to define, using the one-line topology, a third route different from and parallel to the first route, and including all objects electrically connected between the first source object and the load bus object along the third route. In some embodiments, the first route defines a first priority value and the third route defines a second priority value that is higher than the first priority value. In some embodiments, the first priority value is proportional to a number of switch objects included in the first route and the second priority value is proportional to a number of switch objects included in the third route. In some embodiments, only one of the first route and the third route are activated simultaneously during continuous use following a transition time.

In some embodiments, the circuit is further structured to disable the second route thereby inhibiting the second route from being activated.

Another embodiment relates to a system that includes a first genset controller associated with a first genset and a first genset switch; a second genset controller associated with a second genset and a second genset switch; a genset branch switch controller associated with a genset branch switch coupled to the first genset switch and the second genset switch via a genset branch bus; a utility switch controller associated with a utility switch; and a load bus controller associated with a load bus coupled to the genset branch switch and the utility switch, wherein the system is structured to generate a route table defining a first route including the first genset, the first genset switch, the genset branch bus, and the genset branch switch, and the load bus, a second route including the second genset, the second genset switch, the genset branch bus, the genset branch switch, and the load bus, and a third route including the utility switch and the load bus. The system selectively activates the first route by communicating with the first genset controller, the genset branch switch controller, and the load bus controller. The system selectively activates the second route by communicating with the second genset controller, the genset branch switch controller, and the load bus controller. The system selectively activates the third route by communicating with the utility switch controller and the load bus controller.

In some embodiments, the load bus controller includes a load bus routing function that determines which of the first route, the second route, and the third route should be activated or deactivated and provides a transition type function to each controller associated with any switch on any route to achieve activation or deactivation. In some embodiments, the first genset controller includes a switch action processing function structured to receive the transition type function from the load bus controller and control operation of the first genset and the first genset switch to achieve the activation or deactivation of the first route. In some embodiments, the switch action processing function is further structured to request activation of a synchronizer function that adjusts a voltage, frequency, and phase angle of an output of the first genset before the first genset switch is closed. In some embodiments, the switch processing function is structured to communicate a switch state function to the load bus routing function, and a route state function is generated by the load bus routing function based on the switch state function.

Another embodiment relates to a method that includes generating a one-line topology of a power system including source objects, switch objects, bus objects, and controller objects; populating each object with operational parameters; generating a routing table defining available routes between source objects and bus objects, each route including all objects electrically connected between a source object and a bus object of the route; and controlling the power system by activating and deactivating routes.

In some embodiments, operational parameters of each object are selected from a library of object configurations.

In some embodiments, the method also includes generating an active route list including a list of routes to be activated or deactivated, and communicating a transition type to switch objects to control activation or deactivation list of routes.

In some embodiments, the routing table assigns a route ID, an enable attribute, a route priority, and a route path to each route.

In some embodiments, each controller object is allocated to one or more of the source objects, the switch objects, and the bus objects, to enact control of the power system by activating and deactivating routes.

Another embodiment relates to a non-transitory computer readable media having computer-executable instructions embodied therein that, when executed by a circuit of a power system, causes the power system to perform functions to activate and deactivate routes. The functions include identify a first source object, a second source object, and a load bus object; determine locations of the first source object, the second source object, and the load bus object on a one-line topology; receive operational parameters of the first source object, the second source object, and the load bus object; define, using the one-line topology, a first route including objects electrically connected between the first source object and the load bus object; define, using the one-line topology, a second route including all objects electrically connected between the second source object and the load bus object; and control operation of the first route and the second route.

Another embodiment relates to a system that includes a first controller structured to control a first power system object located on a first route of a power system, and a second controller structured to control a second power system object located on a second route of the power system. The first controller and the second controller are both structured to perform a route level function including coordination of actions of the first power system object and the second power system object, and the first controller is a principal controller and the second controller is a participant controller.

In some embodiments, the participant controller is inhibited from performing the route level function.

In some embodiments, the participant controller computes outputs of the route level function asynchronously from the principal controller and the outputs of the participant controller are not used to coordinate actions of the first power system object and the second power system object.

In some embodiments, the participant controller computes outputs of the route level function in synchronicity with the principal controller and the outputs of the participant controller are not used to coordinate actions of the first power system object and the second power system object.

In some embodiments, the route level function performed by the principal controller receives inputs from the principal controller and the participant controller.

In some embodiments, the second controller performs the route level function in the event the first controller is unable to perform the route level function.

In some embodiments, the first controller defines a first object ID and the second controller defines a second object ID that defines a higher value than the first object ID, and the principal controller is selected based on a lowest available object ID.

In some embodiments, the system also includes a third controller structured to control the first power system object. The third controller is a redundant controller structured to perform the route level function including coordination of actions of the first power system object and the second power system object.

In some embodiments, the first power system object is arranged on both the first route and the second route.

Another embodiment relates to a system that includes a first controller structured to control a first power system object located on a first route of a power system, and to receive route level inputs and perform a route level function including coordination of actions of the first power system object; and a second controller structured to control a second power system object located on a second route of the power system, and to receive the route level inputs and perform the route level function including coordination of actions of the second power system object. The route level inputs including information regarding the first route and the second route, and the route level function affects operation of the first route and the second route.

In some embodiments, the first controller is structured to receive only route level inputs related to coordination of actions of the first power system object.

In some embodiments, the first controller and the second controller compute the route level function synchronously or asynchronously.

In some embodiments, the system also includes a third controller structured to control the first power system object. The third controller is a redundant controller structured to perform the route level function.

In some embodiments, the first controller is a first genset controller and the second controller is a second genset controller, and the route level function includes a load sharing function. In some embodiments, the first genset controller is structured to: publish a first load value data, receive a second load value data from the second genset controller, compute an average load based on the first load value data and the second load value data, and control power output of the first power system object to achieve the average load.

Another embodiment relates to a system that includes a first controller structured to control a first power system object of a power system; a second controller structured to control a second power system object of the power system, the first controller and the second controller are both structured to perform a first route level function that includes coordination of actions of the first power system object and the second power system object, and the first controller is a principal controller and the second controller is a participant controller; a third controller structured to control a third power system object of the power system, and to receive route level inputs and perform a second route level function including coordination of actions of the third power system object; and a fourth controller structured to control a fourth power system object of the power system, and to receive the route level inputs and perform the second route level function including coordination of actions of the fourth power system object.

In some embodiments, the participant controller is inhibited from performing the first route level function.

In some embodiments, the participant controller computes outputs of the first route level function asynchronously from the principal controller and the outputs of the participant controller are not used to coordinate actions of the first power system object and the second power system object.

In some embodiments, the participant controller computes outputs of the first route level function in synchronicity with the principal controller and the outputs of the participant controller are not used to coordinate actions of the first power system object and the second power system object.

In some embodiments, the system also includes a redundant controller structured to perform at least one of the first route level function or the second route level function.

In some embodiments, any of the first controller, the second controller, the third controller, or the fourth controller can be structured on a shared circuit.

Another embodiment relates to a non-transitory computer readable media having computer-executable instructions embodied therein that, when executed by a first controller, a second controller, a third controller, and a fourth controller of a power system, causes the power system to perform functions to activate and deactivate routes. The functions include controlling a first power system object of the power system with the first controller; controlling a second power system object of the power system with the second controller; performing a first route level function that includes coordination of actions of the first power system object and the second power system object with the first controller and the second controller, wherein the first controller is a principal controller and the second controller is a participant controller; controlling a third power system object of the power system with the third controller, receiving route level inputs with the third controller; performing a second route level function including coordination of actions of the third power system object with the third controller; controlling a fourth power system object of the power system with the fourth controller; receiving the route level inputs with the fourth controller; and performing the second route level function including coordination of actions of the fourth power system object with the fourth controller.

Another embodiment relates to a non-transitory computer readable media having computer-executable instructions embodied therein that, when executed by a circuit of a power system, causes the power system to perform functions to activate and deactivate routes. The functions include determining a plurality of source objects, each including source functions and being assigned a position on a one-line topology; determining one or more switch objects, each including switch functions and being assigned a position on the one-line topology; determining one or more bus objects, each including bus functions and being assigned a position on the one-line topology; determining one or more load objects, each including load functions and being assigned a position on the one-line topology; and allocating each object to one of a plurality of controllers, each of the controllers structured to cooperatively perform the source functions, the switch functions, the bus functions, and the load functions to provide operation of the system.

In some embodiments, the source functions comprise one or more of: a source state function, a capacity manager function, a synchronizer function, a load sharing function, a source selection function, a source prioritization function, and a grid paralleling function. The switch functions comprise one or more of: a switch state function, a synch check function, and a switch action processing function. The bus functions comprise one or more of: a bus state function, a router function, a system routing table function, a route state function, and a dead bus access function. The load functions comprise one or more of: a load state function, a load decay function, a load add/shed function, and a sensitive load disconnect function.

In some embodiments, the functions also include determining one or more transformer objects, each including transformer functions and being assigned a position on the one-line topology.

In some embodiments, each of the source functions, the switch functions, the bus functions, and the load functions includes a list of available algorithms, and the plurality of controllers utilize a subset of the list of available algorithms based on object type and location on the one-line topology. In some embodiments, the subset includes all available algorithms.

In some embodiments, each function is configured to define operation of the associated object within the one-line topology.

In some embodiments, the plurality of controllers are structured to execute the source functions, the switch functions, the bus functions, and the load functions using software that is common to each of the plurality of controllers.

In some embodiments, each function is configured automatically based on specifications of the object and the location on the one-line topology.

Another embodiment relates to a system that includes a one-line topology including: a source object including a source state function and a synchronizer function; a bus object including a bus state function, a route state function, a router function, and a routing table function; a switch object including a switch state function and a switch action processing function; and a load object including a load state function and a load add/shed function; and a route control system including a router function structured to activate and deactivate routes on the one-line topology via coordination with the source object, the bus object, the switch object, and the load object.

In some embodiments, the source state function identifies a current operating state of the source object, the synchronizer function is structured to control frequency, voltage, and phase difference of the source object, and the router function activates and deactivates routes based at least in part on the source state function.

In some embodiments, the bus state function determines an electrical state of the bus object and outputs of the bus state function are provided to the switch action processing function and the load add/shed function, the route state function identifies a state of each available route so that routes can be activated or deactivated, the routing table function defines the available routes present on the one-line topology, and the router function activates and deactivates routes based at least in part on the bus state function, the route state function, and the routing table.

In some embodiments, the switch state function identifies the position of the switch object, the switch action processing function controls the actuation of a switch object, and the router function provides instructions to the switch action processing function based at least in part on the switch state function to enact activation and deactivation of routes.

In some embodiments, the load state function identifies the state of the load object as energized, power failure, dead, or decaying, the load add/shed function determines if a load demand is high or low compared to an available power supply, and the router function activates and deactivates routes based at least in part on the load state function and the load add/shed function.

In some embodiments, the source object, the bus object, the switch object, and the load object exist as virtual objects on the one-line topology and parameters of the source object, the bus object, the switch object, and the load object can be entered via a user interface.

In some embodiments, the route control system includes one of a floating principal control scheme and a fully distributed control scheme.

Another embodiment relates to a method that includes identifying machines in a power system on a one-line topology; generating objects in a route level control system, each object associated with an identified machine; populating parameters of each object, wherein the parameters include operational requirements of the associated machine; locating each object on the one-line topology; defining routes electrically connecting objects; and controlling operation of the machines by activating and deactivating routes. The activation and deactivation of routes is achieved in accordance with the populated parameters of the objects.

In some embodiments, each object includes functions defining operation of the object within the one-line topology. In some embodiments, the objects are selected for object types comprising source objects, transformer objects, bus objects, switch objects, and load objects. In some embodiments, generating objects in the route level control system includes selecting objects and populating the one-line topology with a software tool.

In some embodiments, generating objects further includes selecting objects from an object palette library within the software tool.

In some embodiments, the route level control system includes a plurality of controllers associated with objects, and controlling operation includes coordinating functions of the objects using one of a floating principal control scheme and a fully distributed control scheme between the plurality of controllers.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 5 is an object table associated with the power system of FIG. 4 according to some embodiments.

FIG. 8 is a route table associated with the power system of FIG. 7 according to some embodiments.

FIG. 11 is a schematic diagram of a power system according to some embodiments.

FIG. 12 is an allocation table associated with the power system of FIG. 11 according to some embodiments.

FIG. 13 is a schematic diagram of a power system according to some embodiments.

FIG. 14 is a schematic diagram of a power system according to some embodiments.

FIG. 18 is an allocation table associated with the power system of FIG. 17 according to some embodiments.

DETAILED DESCRIPTION

Figures 1, 2:
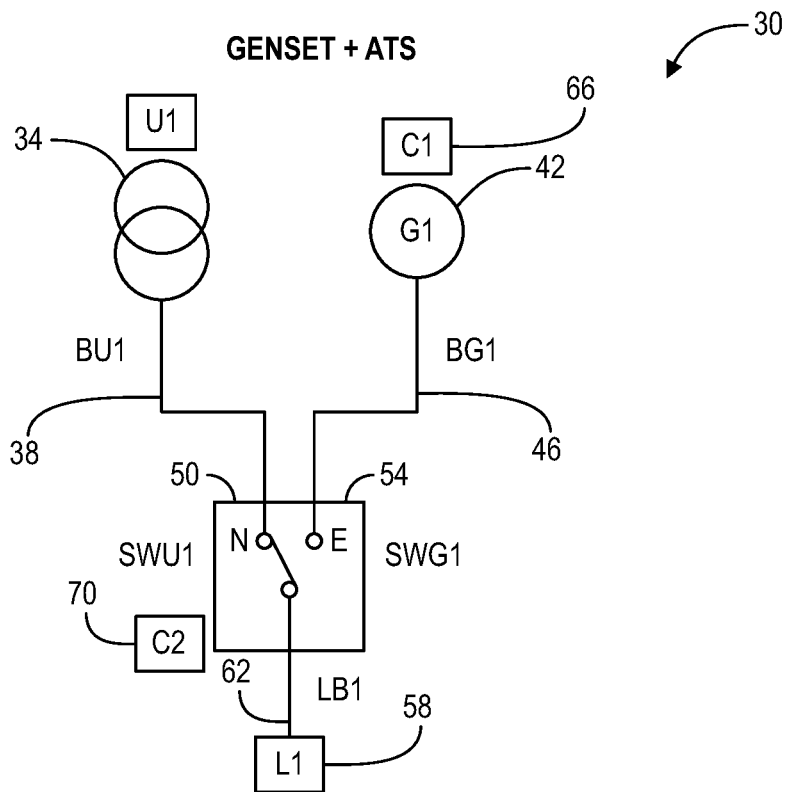
FIG. 1 is a schematic diagram of a power system according to some embodiments.
FIG. 2 is an object table associated with the power system of FIG. 1 according to some embodiments.

Following below are more detailed descriptions of various concepts related to, and implementations of, methods, apparatuses, and systems for power routing. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "power system topology" means the interconnection map of power sources, power switches, and loads for a specific power system. As utilized herein, the terms "single line diagram", "one-line diagram", or "one-line topology" means a simplified representation of a power system topology.

Referring to the figures generally, the various embodiments disclosed herein relate to systems, apparatuses, and methods for power routing and distribution. Some embodiments aim to improve existing power system control schemes with systems, apparatuses, and methods structured to sequence and connect, disconnect, and transition sources to load busses for any arbitrary power system topology. Some embodiments control structures for connecting and disconnecting specific load circuits. In general, embodiments discussed herein identify components of a power system as objects within a system architecture. For example, a power system may include source objects (e.g., a grid power connection provided by a utility company, a generator set, a solar array, a battery bank, etc.), bus objects (e.g., source buses, load buses, distribution buses, etc.), transformer objects (e.g., a passive power transformer), switch objects (e.g., automatic transfer switches (ATS), load switches, source switches, circuit breakers, etc.), and controller objects (e.g., source controllers, load bus controllers, switch controllers, etc.). Each object is assigned an individual object identifier and inserted into a system architecture that can be represented with a one-line topology. Routes are then defined between each source and each load defined on the one-line topology to establish potential routes for power transfer from sources to loads. For example, in some system architectures, more than one route may be available to provide power from one source to a given load. Each route is assigned an individual route identifier. Each object is then assigned or allocated to a controller. Typically, an object will be assigned to an adjacent controller. For example, a genset controller coupled to and controlling a generator set source object may also be allocated to control a source bus. One each object is allocated to a controller, the power system can control operation of the objects using a centralized controller in communication with each individual controller object, or a distributed control scheme. For example, a floating principal control scheme can be used wherein one controller object within the power system is acting as a centralized control for a particular task, but the individual controller object that is acting as the centralized control changes depending on the task required by the power system. In other embodiments, a fully distributed control scheme is employed wherein all controller objects that perform a particular system function are equals. One characteristic that makes them fully distributed is that each controller determines its own action to take, rather than determining action for others (as in the case of a principal in the floating principal control scheme). In both the floating principal control scheme and the fully distributed control scheme, redundancy is provided in the system because more than one controller object is capable of operating the functions of the power system.

The object based system architecture allows the design, implementation or commissioning, and operation of the power system to be simplified. Each object is recognized by each controller and is customized with attributes or parameters. This allows each controller to recognize what it is connected to or what route each object lives on, and how each object affects that route. The ability to build one-line topology based systems and control using object based routes improves the efficiency of design and construction while providing a more robust control scheme.

As shown in FIG. 1, a simple power system 30 includes a utility 34 that provides grid power (e.g., provides alternating current (AC)) connected to a utility source bus 38, and a generator set (genset) 42 that provides AC power to a genset bus 46. The utility source bus 38 is connected to a utility source switch 50 and the genset bus 46 is connected to a genset switch 54. In some embodiments, the utility source switch 50 and the genset switch 54 are incorporated in an automatic transfer switch (ATS) connected to a load bus 62. The automatic transfer switch can be arranged or structured to provide power from one of the utility bus 38 or the genset bus 46 to the load bus 62. A load 58 is connected to the load bus 62 are structured to consumer power provided by the utility 34 or the genset 42.

In general, the power system 30 operates by drawing power to the load 58 from the utility 34. In the event of a power disruption to the utility 34, the ATS including the utility switch 50 and the genset switch 54 can actuate and connect the load to the genset 42.

The power system 30 includes a genset controller 66 and a switch controller 70. The genset controller 66 is primarily associated with the genset 42 and controls the operation of the genset 42. The switch controller 70 is primarily associated with the ATS including the utility switch 50 and the genset switch 54.

Section 1—Objects

As shown in FIG. 2, the components of the power system 30 are identified as objects. Power systems generally include five object types: source objects, bus objects, switch objects, load objects, and transformer objects. The power system 30 does not include a transformer object, but other power systems described later within this document do include transformer objects. Within the power system 30, each component is identified with an object ID, an object name, an object type, and an object subtype. The object ID and object name are used by the controllers (e.g., genset controller 66 and switch controller 70) to identify components. The object type defines what parameters of the object are configurable.

Each object type has its responsibilities (functions) in the operation of the power system 30. Each object type also has attributes that define its identity and ratings. Note that most objects, but not all, are machines in the power system 30. Utility source bus 38, the genset source bus 46, and the load bus 62 are bus object types and are important in the operation and coordination of the power system 30, but they are not technically machines. The power system 30 itself may also be considered as an object, as well as a controller (e.g., the genset controller 66 and the switch controller 70). An object type becomes a container for functionality that the object type owns.

Figure 3:
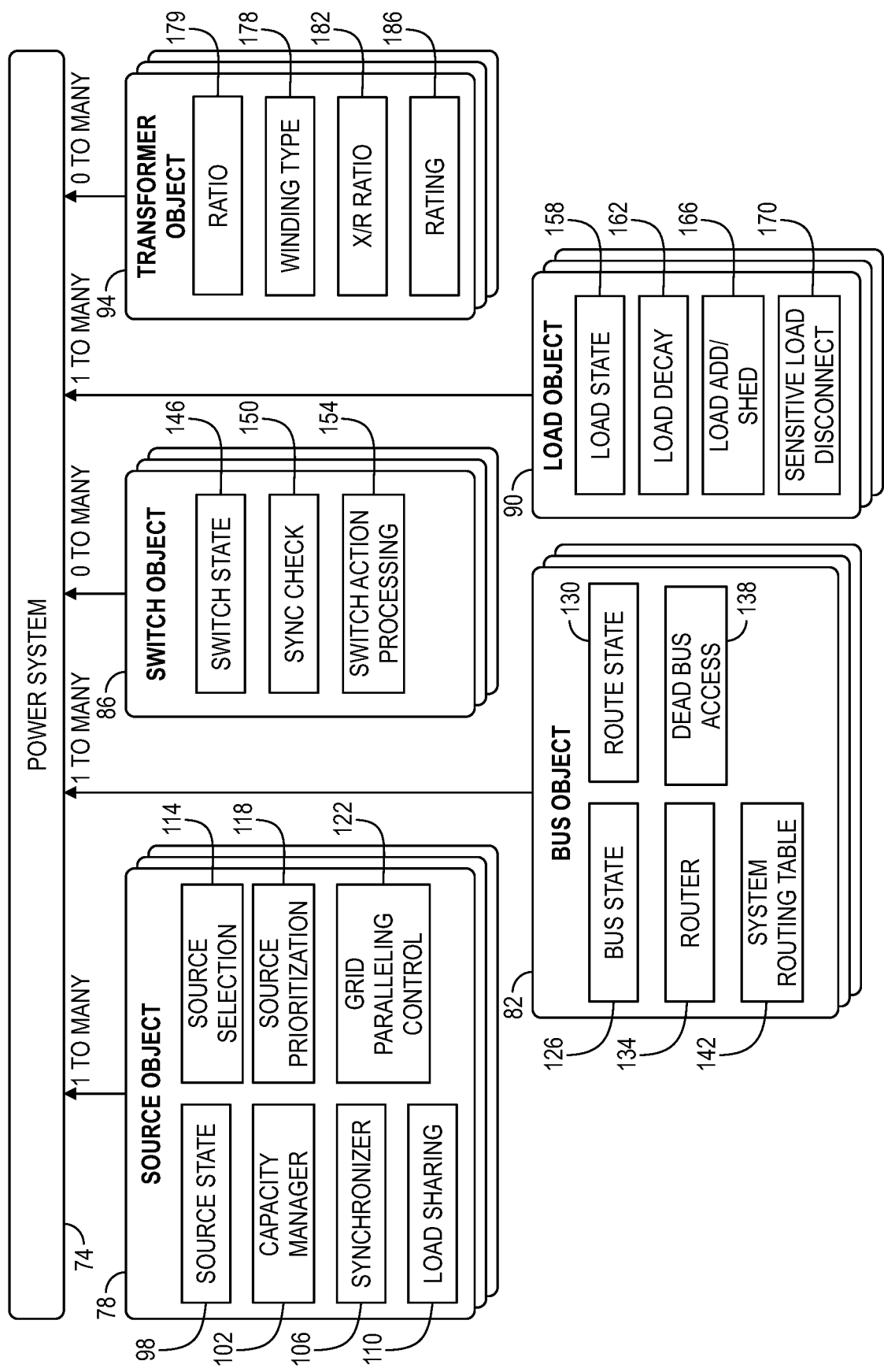
FIG. 3 is a schematic diagram of object functions associated with the power system of FIG. 1 according to some embodiments.

As shown in FIG. 3, each instance of an object type can include a number of functions, parameters, or attributes that can be customized to represent the operation of the individual object within a power system (e.g., the power system 30). In other words, a power system 74 is abstracted to be composed of the following object types: sources 78, busses 82, switches 86, loads 90, transformers 94, and additionally controllers (not shown in FIG. 3) and the power system 74 itself. According to embodiments disclosed herein, power systems can be arranged as a collection of object instances; one instance for each occurrence of that type of object. Each object type is a container for a superset of system control functions tied to that object type. The set of functions contained by an object type are always the same implementation (e.g., software code) regardless of where the object instance is in the power system. The behavior of an individual object instance is modified only through configuration setting changes, not through new software code (e.g. 'C' code).

Object instances get distributed to the controllers around the system typically based on what the controllers are physically connected to. This enables functional abstraction from any particular controller implementation or specific installation controller topology. That is, the objects and functions are largely decoupled from the controller(s) they will live/run on. For example, a genset controller (e.g., the genset controller 66) may control the functions of an associated genset (e.g., the genset 42) by controlling fueling, aftertreatment, etc. but the genset controller may also control functions of other objects, and other controllers may impact the operation of the genset controller. Each controller is capable of running multiple instances of the different object types. The objects and their functions all communicate with each other via a common global dataspace. A system-wide global data space can be created by a networking technology and protocol such as DDS on Ethernet. Thus, the functions in each object instance will act in concert with the other object types to accomplish the system control and sequencing needs to operate the power system.

This differs from a conventional power system control. A conventional power system typically relies on a centralized controller running power system control functionality which was custom developed/programmed for a specific customer site installation. Object based distributed control provides an opportunity for a more flexible installation while providing a robust control environment and reducing overall system complication and required customization.

Below, object specific functions are discussed with respect to FIG. 3. The functions associated with specific object types is exemplary. Other functions may be associated with the object types, including additional parameters, customizable settings, etc. Additionally, some functions may be eliminated from object types, or may be included in different object types than shown in FIG. 3.

Section 1.1—Source Objects

Each source object 78 within the power system 74 (e.g., the utility 34 and the genset 42) defines seven source functions including: source state 98, capacity manager 102, synchronizer 106, load sharing 110, source selection 114, source prioritization 118, and grid paralleling control 122 functions. In some embodiments, more functions or less functions may be included with each source object. In some embodiments, unused functions may be nulled within a control scheme, or custom functions may be added.

The source state function 98 identifies the current operating state of the source object. A source object needs to make known its current operating state for source selection and other functions to work. Note that the source state function 98 is used by the power system control scheme, and is not necessarily indicative of or used by the local machine control functions. For example, the genset 42 may be operating in a diagnostic state and still actively operational, but it is not available to provide power as a source to the power system 30. The source state function 98, would then identify the genset 42 as unavailable, even though it is currently operating. in some embodiments, to fully support abstraction of the source object within the larger control scheme of the power system 30, the source states should be generic regardless of the type of source. For example, the source object may include a superset of a source states, and a subset of source states is selected based on the specifics of the source object (e.g., a first subset of source states for genset and a second subset of source states for a utility). Sources also have other dynamic information that they share with the power system control functions (e.g. current capacity, load, etc.) as part of their "state" information. In some embodiments, the source state function 98 includes information indicative of whether the source ready to be called up if it is needed, whether the source is available based on the sensors and has it had time to stabilize, whether or not the source has failed, and/or if the source is disabled (e.g. due to a shutdown fault or not in automatic mode).

The capacity manager function 102 provides a dynamic model of available capacity within the power system 30. Continuous management of the online capacity is important. The required power capacity drives the decision of how many sources (in priority order) are connected to the load bus objects (e.g., the load bus 62). There must be enough capacity online to not only support the current loads, but also to accept additional loads without overloading the power system 30 before additional sources (if available) could be brought online. For critical applications, there may also need to be extra source(s) online to cover for the unexpected sudden loss of a source. Inputs to the decision to add sources or remove sources include:
What are the individual source capacities? Some source objects may be dynamic such as a battery, a solar array, or wind sources.
What is the current online total capacity?
What is the current total load?
What is the current online reserve capacity (total capacity−load)?
What is the desired level of reserve capacity?
Does there need to be protection against unexpected loss of any one source? Two source?
If grid connected, what are the grid power setpoints?
Is there a notification of a significant load step coming? How much is that load?
Is there a notification of a significant loss of source capacity coming (e.g. source derate, solar influx reduction, wind speed decrease, or battery discharge limits)?
Does a source need to be intentionally taken offline (e.g. for service)?
If this is a black start, how much capacity should be brought on initially? All? Selected sources?

The synchronizer function 106 provides parameter and status of synchronization of a source object. Traditionally, a genset controller synchronizes itself to the bus it connects to or to another single source such as a utility. The single genset controller makes all the sensing measurements to accomplish this. With a distributed power system control scheme supporting a variety of one-line topologies or configurations and source types, this function becomes a service capable of synchronizing a single or multiple gensets to any sensed point in the power system. The synchronizer function 106 allows for communication of synchronization parameters between controllers within the power system 30 to allow for cohesive synchronization and distributed control. That is, sensing and initiation of synchronization can occur on other controllers. Additionally, the synchronizer function 106 identifies if the source object is capable of synchronizing. The system needs to know which sources can be called upon to synchronize for purposes of paralleling that source to a live bus. Synchronizing could include any abilities to match frequency, match a frequency offset, match voltage, or match phase. It may not include all.

The load sharing function 110 identifies if the source object is capable of maintaining nominal voltage and frequency while dividing the load amongst other load sharing sources. Typically the source object must also be capable of being a grid former in order to be used in load sharing.

The source selection function 114 brings together the source prioritization, source state, and power capacity management information to output the list of sources that should be online. If a source needs to change, the process of bringing it online or offline is then handled by other downstream functions (e.g., a routing and sequencing control associated with the bus objects).

The source prioritization function 118 provides a listed priority order for the available source objects. All sources have an active priority number assignment that is used to determine what order they should be called upon depending on the state of other sources and how much load there is. This priority number may be dynamic, or it could be static. The priority assignment comes from what the current objectives are for operation of the power system. For some objectives, the control system can calculate the prioritization. For other more complex objectives/calculations, an external optimization algorithm (e.g. a cloud or edge computing device) may set the source prioritization. Some possible locally managed objectives include:
Run the system to maximize the contribution from renewable sources.
Run the system so that machines do not come up for service all at the same time.
Run the system so that all machines keep an approximately equal amount of wear-and-tear.
Run the system to maximize the life of the assets.
Run the system to minimize operating expenses.
Run the system based on dynamic prioritization set by an external optimization algorithm.

The grid paralleling control function 122 identifies which source types can be operated in parallel with other source object types or subtypes. For a given power system, limitations are often placed on which sources can operate in parallel with one another and for how long. To solve the generic problem for any power system, an $N^2$ matrix of sources is needed to be able to configure the allowed combinations. For example, the grid paralleling function for a source object may define one or more of the following options: OT=Open Transition; HCT=Hard Closed Transition (<100 msec overlap); SCT=Soft Closed Transition (limited by Max Parallel Time); All=all modes allowed; or EP=Extended Parallel (no time limit).

Section 1.2—Bus Objects

Each bus object 82 within the power system 30 (e.g., the utility source bus 38, the genset source bus 46, and the load bus 62) defines five bus functions including: bus state 126, route state 130, router 134, dead bus access 138, and system routing table 142 functions. In some embodiments, more functions or less functions may be included with each bus object. In some embodiments, unused functions may be nulled within a control scheme, or custom functions may be added.

The bus state function 126 of any bus object 82 is needed by switch control logic as well as other functions such as load add/shed. The electrical state of each bus object 82 is determined by a bus state algorithm. Possible bus states include: available, failed, dead, or decaying. A load bus router function can use the bus state as part of determining a transition type. A switch action processing function can use the bus state in order to determine whether or not closing a switch object can be considered.

The route state function 130 identifies routes that power can flow through the power system 30 from sources to loads. The route state function 130 identifies the state or health of each available route so that routes can be activated or deactivated. Possible states include: unknown, disconnected, unable to disconnect, connected, and/or unable to connect. The state of each route is determined by a route state algorithm. The route state can be used by the load bus router to select viable routes. If a route is unable to connect, the load bus router can choose the next highest priority route (if one is available).

One core concept of the power system 30 is a sequencing control concept that identifies routes connecting load busses and sources and activates and/or deactivates the routes by controlling the switches between closed or open states. The switch logic (e.g., stored in the switch controller 70) takes care of getting the switch (e.g., the utility switch 50 and the genset switch 54) safely closed (e.g., via the synchronizer service request, the sync check, the dead bus close, etc.). The router function 134 decides which routes to activate or deactivate based on the current source selections. The router function 134 also determines what type of transition (e.g., open transition, closed transition, etc.) is occurring and may be involved in sequencing of the transition. The router function 134 is shown as being owned by a load bus object 82. In some embodiments, the router function 134 can operate as a floating principal function that could run in multiple controllers or be associated with multiple different object types for redundancy. The router function 134 acts between load buses and sources. In power systems where a load bus has individual load feeders below it, a distributed load add/shed feature will separately take care of managing the connecting and disconnecting of the load circuits. Additionally, in some embodiments, the loads themselves will be connected and disconnected via the router function.

In some embodiments, a source object 78 or a load object 90 can request a route hold to maintain a particular route in the connected state. If no other higher priority reasons exist to deactivate that route, it will be granted and remain held active until the load object 90 or source object 78 indicate it is no longer needed. A source object 78 can request a route hold to insure a minimum length of run time with load to prevent adverse life/maintenance effects, for example. A load object 90 can request a route hold to insure it remains powered continuously for some minimum amount of time to recharge UPS batteries, for example. A load object 90 can also request a route hold if the power system is configured to require manual intervention for a retransfer.

The dead bus access function 138 (alternatively called First Start) acts to close a single live source object 78 (e.g., the genset 42) to a dead bus while inhibiting all other source objects 78 (e.g., all other gensets) from closing to that dead bus. With a distributed power system control scheme supporting a variety of one-line topologies or configurations and source types, the dead bus access function 138 can be made generic and acts as a service for anywhere in the power system 74 that a switch/breaker OBJECT 86 needs to be closed between either a live and dead side, or even two dead sides. The dead bus access function 138 acts to coordinate and arbitrate the closure of a single live source to energize a dead bus while blocking all other live sources from closing to that bus until the operation is complete. Fall backs in the event of failure scenarios can also be included.

The system routing table function 142 defines the available routes presented on the one-line topology. The system routing table function 142 lists all possible connection paths between load bus objects 82 and individual source objects 78. The system routing table function 142 provides a routing table for getting power from source objects 78 to load bus objects 82 and is used by load bus routers. The system routing table function 142 can be programmed into all controllers, or a subset of controllers, on the power system 74 by a tool including a user interface. Ideally, the tool would have a graphical interface and a library of system objects that can be used to draw a one-line topology. The tool can then automatically compute the routing table.

Section 1.3—Switch Objects

Each switch object 86 within the power system 74 (e.g., the utility switch 50 and the genset switch 54) defines three switch functions including: switch state 146, synch check 150, and switch action processing 154 functions. In some embodiments, more functions or less functions may be included with each switch object 86. In some embodiments, unused functions may be nulled within a control scheme, or custom functions may be added.

The switch state function 146 identifies the position of the switch object 86, the position of main contacts of the switch object 86, if the switch object 86 is being serviced, switch failure, if a close action is pending, and/or if the switch object 86 is inhibited from closing.

The synch check function 150 enables closing of two live source objects 78 by looking to see that voltages, frequency, and phase angles are matched to a level which is safe for the equipment (e.g., mechanical/electrical stresses) and will not produce unacceptable power disturbances. The synch check function 150 is typically executed using measurements of both source objects 78 made at a single controller. This can be a fully local function in an associated controller that has sensing access or visibility on each side of a connected switch object 86.

The switch action processing function 154 controls the actuation of a switch object 86. Based on the system routing table function 142, a switch object 86 is opened, closed, or does nothing based on the switch action processing function 154. The switch action processing function 154 also initiates follow-on actions such as the sync check function or dead bus access functions 138 for closing or waiting for a ramp unload to complete to enable opening. Additionally, the switch action processing function 154 monitors bus spare capacity by calculating the available capacity on a bus object 82 (e.g., the difference between the source capacity ratings and how much load is currently on the bus). Bus spare capacity can be used to decide if a pending close is allowed to occur. If there is not enough spare capacity on the upstream side of the switch object 86 to support the loads on the downstream side, the switch will not close. Some scenarios under which it applies are at any switch object 86 that if closed will energize dead loads.

Section 1.4—Load Objects

Each load object 90 within the power system 74 (e.g., the load 58) defines four load functions including: load state 158, load decay 162, load add/shed 166, and sensitive load disconnect 170 functions. In some embodiments, more functions or less functions may be included with each load object 90. In some embodiments, unused functions may be nulled within a control scheme, or custom functions may be added.

The load state function 158 identifies the state of the load object 90 as energized, power failure, dead, or decaying, and determines all load objects 90 connected to a common or shared bus object 82. Once the load state function 158 determines which load objects 90 are connected, the current state of all connected load objects 90 is determined.

The load decay function 162 determines when load objects 90 have been unpowered and disconnected from a source long enough to allow it to be reconnected to a live source. For example, it allows time for motor loads to stop spinning before re-energizing them so as to avoid undesirable operation/equipment stresses.

The load add/shed function 166 may work with the load decay function 162 to determine if load demands are high or low compared to the available power supply (i.e., from the connected source objects 78) and connect or disconnect current on common bus object 82 accordingly. The load add/shed function 166 works to add (i.e., connect) load circuits as capacity allows, and shed (i.e., disconnect) load circuits when the system capacity is overloaded. The load add/shed function 166 may be an independent function, or may make use of the router function 134.

The sensitive load disconnect function 170 provides control for cases where a sensitive load is connected directly on a load bus object 82. In sensitive load object 90 scenarios, the sensitive load disconnect function 170 communicates with an upstream switch object 86 to control open, close and other actions to provide control to the sensitive load object 90. In other words, if a load circuit has a sensitive load designation, that circuit will disconnect (i.e., open) immediately upon detection of a power failure rather than remain connected to a potentially only partially failed source such as a brownout, or single phasing situation.

Section 1.5—Transformer Objects

Each transformer object 94 within the power system 74 defines four transformer functions including: ratio 174, winding type 178, X/R ratio 182, and rating 186 functions. In some embodiments, more functions or less functions may be included with each transformer object 94. In some embodiments, unused functions may be nulled within a control scheme, or custom functions may be added. The transformer object 94 may be responsible for determining and communicating its current state. In many embodiments, a transformer object 94 will not have any direct control actions. The power system performance will benefit by knowing the location (electrically) of the transformer object 94, and its specifications. For example, synchronizing/sync check may want to know about it for delta/wye 30 deg shifts. Transformer type specification will make determination of +30 or −30 automatic. It would also want to know the transformer ratio function 174 for voltage matching. Power flow management may want to know about its X/R ratio function 182 to better balance load sharing if there are different X/R's in the source paths.

Section 2—System Architectures

Figure 4:
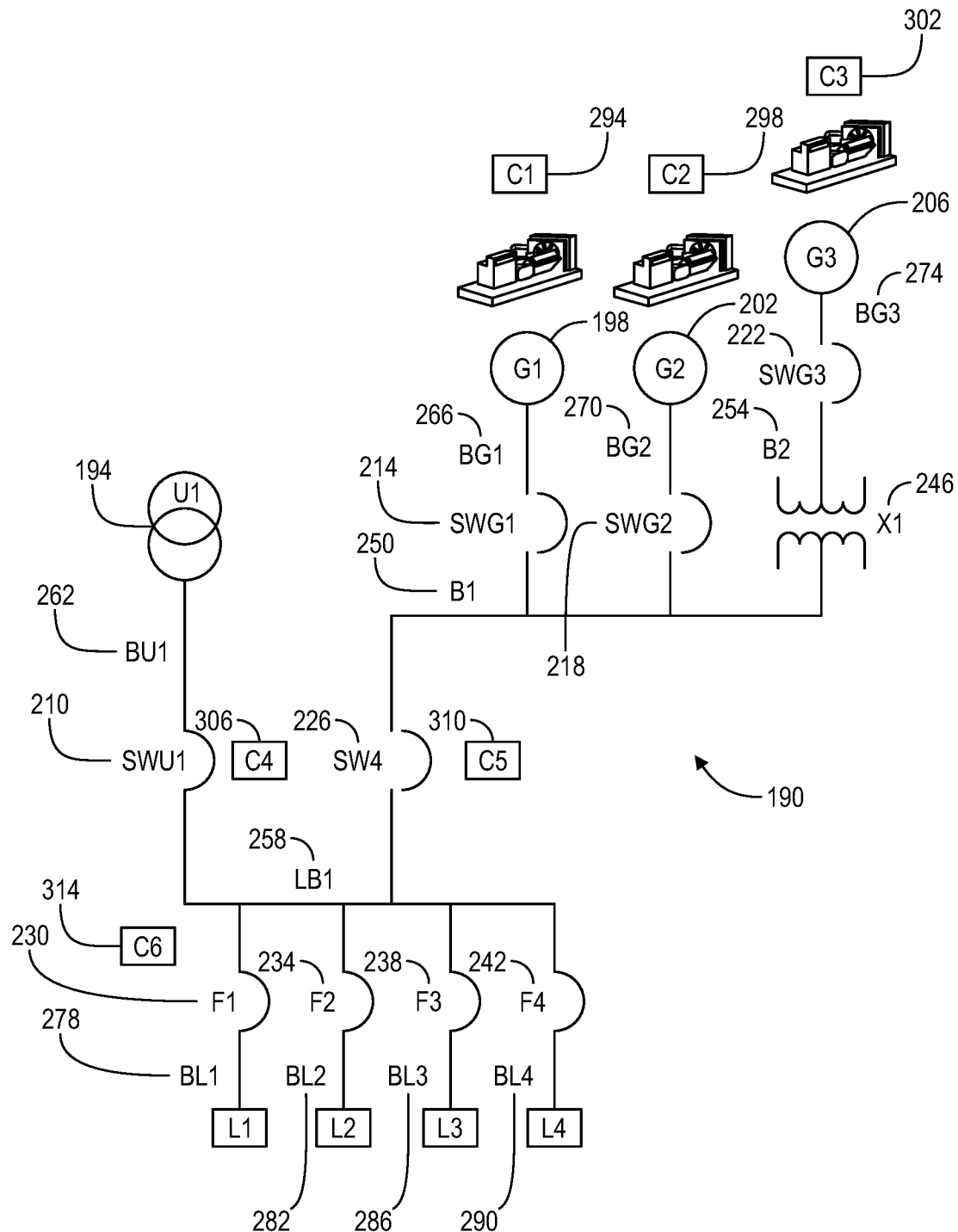
FIG. 4 is a schematic diagram of a power system according to some embodiments.

The object based abstraction discussed above can be applied to any power system architecture. FIG. 4 shows a power system 190 that includes more components/objects than the power system 30 shown in FIG. 1. The object ID, object name, object type, and object subtype for each object in the power system 190 are shown in FIG. 5. The power system 190 includes four source objects including a utility 194, a first genset 198, a second genset 202, and a third genset 206.

The power system 190 includes nine switch objects. Five switch objects are source switches and include a utility switch 210 connected to the utility 194, a first genset switch 214 connected to the first genset 198, a second genset switch 218 connected to the second genset 202, a third genset switch 222 connected to the third genset 206, and a genset branch switch 226 coupled to each of the first genset 198, the second genset 202, and the third genset 206. Four switch objects are load switches and include a first load switch 230, a second load switch 234, a third load switch 238, and a fourth load switch 242.

A transformer object 246 is connected between the third generator switch 222 and the genset branch switch 226. In some embodiments, the power system 190 can include more than one transformer object.

The power system 190 includes 11 bus objects. A genset branch bus 250 is connected between the first genset switch 214, the second genset switch 218, the transformer 246, and the genset branch switch 226; a transformer bus 254 is connected between the third genset switch 222 and the transformer 246; a load branch bus 258 is connected between the utility switch 210 and the genset branch switch 226, and the first load switch 230, the second load switch 234, the third load switch 238, and the fourth load switch 242; utility bus 262 is connected between the utility 194 and the utility switch 210; a first genset bus 266 is connected between the first genset 198 and the first genset switch 214; a second genset bus 270 is connected between the second genset 202 and the second genset switch 218; a third genset bus 274 is connected between the third genset 206 and the third genset switch 222; a first load bus 278 is connected between a first load and the first load switch 230; a second load bus 282 is connected between a second load and the second load switch 234; a third load bus 286 is connected between a third load and the third load switch 238; and a fourth load bus 290 is connected between a fourth load and the fourth load switch 242.

The power system 190 also includes six controller objects including a first genset controller 294, a second genset controller 298, a third genset controller 302, a utility switch controller 306, a genset branch switch controller 310, and a load branch controller 314. The control of all objects within the power system 190 is achieved with the controller objects and the functions of each object type are assigned to particular controllers as described in more detail below. The coordination and execution of object functions can be performed via a distributed control scheme utilizing all or some of the controller objects. Distributed control schemes will also be discussed in further detail below.

Each of the objects in power system 190 can be configured using settings within the controllers to represent the real world machines and busses functionality. This allows the power system 190 to be controlled accurately using settings and configuration designed around a one-line topology rather than requiring a custom programmed control system.

Section 3—Routes

Figures 6, 7:
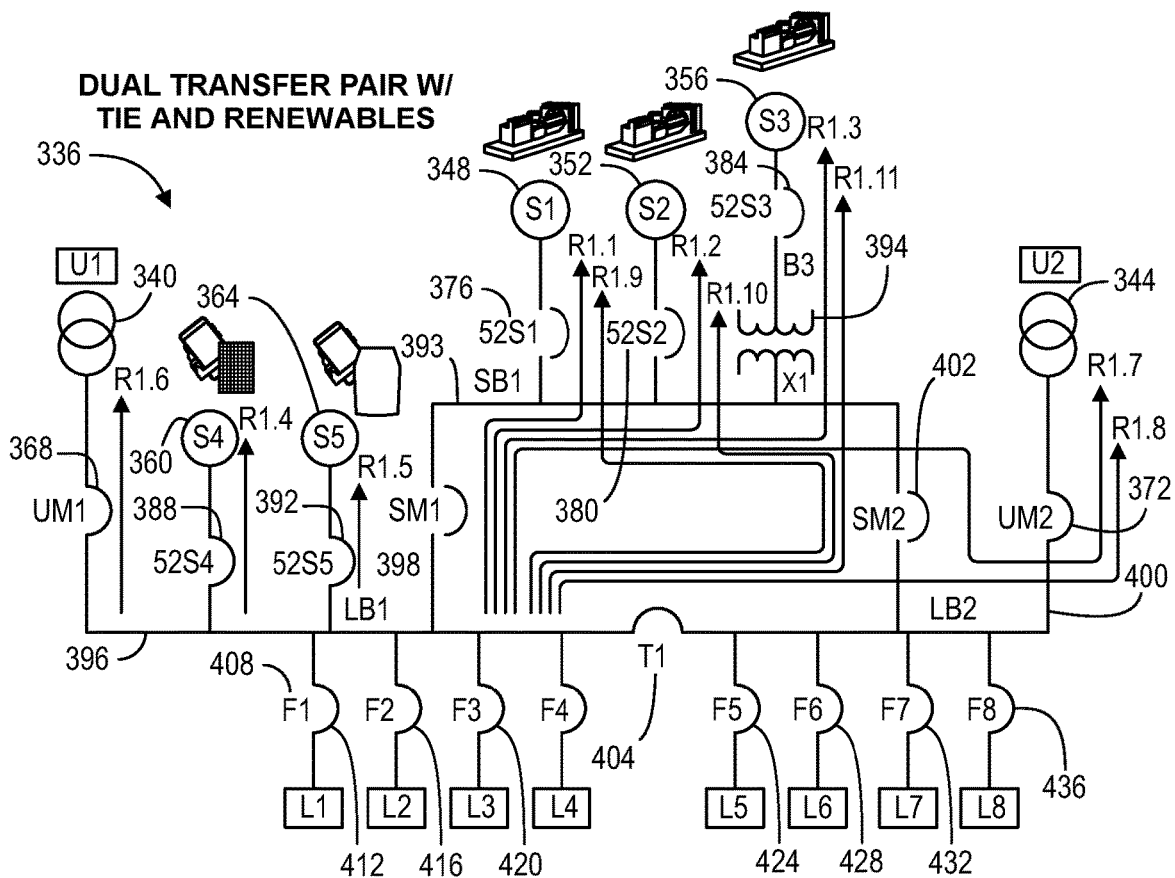
FIG. 6 is a route table associated with the power system of FIG. 4 according to some embodiments.
FIG. 7 is a schematic diagram of a power system according to some embodiments.

The power system 190 includes a number of interconnected objects and provide pathways or routes that power can flow from source objects to load objects. As shown in FIG. 6, the system routing table (e.g., as created by the system routing table function 142 of the bus objects) lists all possible routes between load busses and individual sources for a given power system. An enable attribute is a configuration to allow a route to be disabled. The route ID attribute is a combination of the load bus identifier and the source identifier. A route priority is a configuration used when there is more than one route to a source from a load bus. It may have a default value derived from the number of switches on the route, but be changeable by the user. For example, the more switches, the lower the priority.

The system routing table provides information to the load bus router so that it knows what the routes are that go to the various sources (so it knows which routes to activate to get the desired sources connected). It is also used by switch action processing so that a switch can know which routes it "lives" on so that it can respond appropriately to an active route list generated by the router function.

The power system 190 shown in FIG. 4 defines four available routes and depicted in FIG. 6. These routes define all the available power pathways to provide power to the load branch bus 258 from the available source objects. All routes in FIG. 6 are shown as enabled (Y), but in some embodiments, a route may be disabled (N) in the event that a source object is offline (e.g., an interruption has occurred in the utility 194). A first route 320 is given a route ID LB1.G1, a route priority of 1, and defines a route path of LB1-SW4-B1-SWG1-G1. The route ID can generally indicate a point-to-point route (e.g., LB1.G1 indicates that the route connects the first genset 198 and the load branch bus 258) or use another naming standard as desired. The route priority is set to 1 because multiple routes between a source and a load are not possible in the power system 190. The route path of the first route 320 defines that power flows from the first genset 198, through the first genset switch 214, the genset branch bus 250, the genset branch switch 226, and onto the load branch bus 258.

A second route 324 is given route ID LB1.G2 indicating that power flows generally from the second genset 202 to the load branch bus 258. The route is enabled, and has a priority of 1. The route path is LB1-SW4-B1-SWG2-G2 indicating that power flows from the second genset 202, through the second genset switch 218, the genset branch bus 250, the genset branch switch 226, and onto the load branch bus 258.

A third route 328 is given route ID LB1.G3 indicating that power flows generally from the third genset 206 to the load branch bus 258. The route is enabled, and has a priority of 1. The route path is LB1-SW4-B1-SWG3-G3 indicating that power flows from the third genset 206, through the third genset switch 222, the genset branch bus 250, the genset branch switch 226, and onto the load branch bus 258. As illustrated by the third route path, passive objects such as the transformer 246 may be excluded from the route path. In some embodiments, passive objects, or all objects, may be included in the route path definition.

A fourth route 332 is given route ID LB1.U1 indicating that power flows generally from the utility 194 to the load branch bus 258. The route is enabled, and has a priority of 1. The route path is LB1-SWU1-U1 indicating that power flows from the utility 194, through the utility switch 210, and onto the load branch bus 258.

Therefore, the route table for the power system 190 includes four possible routes, the first route 320, the second route 324, the third route 328, and the fourth route 332. The control system of the power system 190, including the first genset controller 294, the second genset controller 298, the third genset controller 302, the utility switch controller 306, the genset branch switch controller 310, and the load branch controller 314 utilizes the route table to efficiently control all objects residing on a various route, producing desirable results. For example, if the utility 194 were taken offline, the power system 190 can recognize a need for more power and activate any of the first route 320, the second route 324, and the third route 328 to produce power. The activation of route paths provides an automated and coordinated solution to actuating or controlling all the objects that reside on the activated route path.

To further demonstrate the routing table concept, a complex power system 336 is shown in a one-line topology in FIG. 7 and includes a first utility 340 and a second utility 344 which may be grid based or otherwise provided power sources from an external source (e.g., a power plant). The power system 336 also includes a first genset 348, a second genset 352, and a third genset 356. In some embodiments, the gensets are diesel powered or powered by an internal combustion engine burning another fuel type. The power system 336 also includes a solar array or solar station 360 and a battery bank 364. Other power sources such as wind, or hydropower and any other power sources may be connected to power systems contemplated herein. The power system 336 includes seven source objects. In some embodiments, more than seven or less than seven source objects are included.

The power system 336 also includes seven corresponding source switches including a first utility switch 368 selectively coupling the first utility 340, a second utility switch 372 selectively coupling the second utility 344, a first genset switch 376 selectively coupling the first genset 348, a second genset switch 380 selectively coupling the second genset 352, a third genset switch 384 selectively coupling the third genset 356, a solar switch 388 selectively coupling the solar station 360, and a battery switch 392 selectively coupling the battery bank 364.

A genset branch bus 393 is structured in communication with the first genset 348 via first genset switch 376, the second genset 352 via the second genset switch 380, and the third genset 356 via third genset switch 384 and a transformer 394. The genset switches 376, 380, 384 provide selective coupling genset source objects with the genset branch bus 393.

The genset branch bus 393 is structured in selective communication with a first load bus 396 via a first genset branch switch 398, and a second load bus 400 via a second genset branch switch 402. A load bus switch 404 provides selective communication (i.e., connection) between the first load bus 396 and the second load bus 400.

Four load switches 408, 412, 416, 420 are connected to the first load bus 396 and selectively provide power to four corresponding loads. Four load switches 424, 428, 432, 436 are connected to the second load bus 400 and selectively provide power to four corresponding loads. While four loads are shown coupled to each load bus, more than four or less than four loads are contemplated. Each of the loads may include a single power consumer, or may include a system of loads (e.g., a microgrid fed by the power system 336).

Each of the objects defined on the one-line topology shown in FIG. 7 would be assigned attributes or parameters as discussed above when the object is added to the one-line topology so that the functionality of the object is known within the power system 336. An object table would be generated providing object names (e.g., the first genset 348 is named S1, etc.) and parameter lists. Additionally, the power system 336 includes controllers associated with various objects to provide actuation and control of components.

The power system 336 includes more route dynamics than the power system 190 shown in FIG. 4. The power system 336 defines twenty-four (24) discrete routes shown in FIG. 8. Eleven of the routes are shown in FIG. 7 connecting the first load bus 396. The routes connecting the second load bus 400 are not shown to provide better clarity within FIG. 7. The routes defined by the power system 336 illustrate the concept of priority more clearly. For example, route R1.7 includes a route priority of 2 because the route includes the first genset branch switch 398, the genset branch bus 393, and the second genset branch switch 402 in order to couple the first load bus 396 with the second utility 344. Alternatively, the route R1.8 includes a route priority of 1 because the path is more direct between the first load bus 396 and the second utility 344.

In the example shown in FIGS. 7 and 8, the load bus router (e.g., the load bus router 134 discussed above) for each of the routes is allocated to the associated load bus. That is to say, all routes ending on the first load bus 396 will be controlled by the load bus router associated with the first load bus 396 and all routes ending on the second load bus 400 will be controlled by the load bus router associated with the second load bus 400. One tenant of the sequencing control concept is that there are routes connecting load busses and sources and that by activating or deactivating a route, the switches on the route act to close or open. The switch logic takes care of controlling each individual switch (e.g., to close according to a desired sequencing including a synchronizer service request, a sync check, a dead bus close, etc.). The load bus router decides which routes to activate or deactivate based on the current source object selections. It will also determine what type of transition (open transition, closed transition, etc.) is occurring and may be involved in sequencing of the transition. The load bus router functionality can be owned by or allocated to a load bus object and operate as a floating principal function that could run in multiple controllers for redundancy. Note that the load bus router acts between load buses and sources. In applications where the load bus has individual load feeders below it, the distributed load add/shed feature may separately take care of managing the connecting/disconnecting of the load circuits. In some embodiments, the loads themselves will be connected and disconnected via the router function 134.

Individual source objects or load objects may request a route hold to maintain a particular route in the connected state. If no other higher priority reasons exist to deactivate that route, the route hold will be granted and the route with remain held active until the load object or source object indicate it is no longer needed. A source may request a route hold to ensure a minimum length of run time with load to prevent adverse life/maintenance effects for example. A load object may request a route hold to ensure it remains powered continuously for some minimum amount of time to recharge UPS batteries for example. A load object may also request a route hold if the system is configured to require manual intervention for a retransfer.

In some embodiments, the default route priority is simply the sum of the number of switches in the route. If there are multiple routes to a source, the algorithm to choose a route to call will depend on a number of things, including the route priority. Other factors in route selection may include the current state of the system and switches. For example, if there are more open switches on the path set with a higher priority (i.e., a lower priority number) than on the path with a lower priority (i.e., a higher priority number), it may make sense to use the lower priority path having the higher priority number (e.g., selecting route R1.7 instead of route R1.8). In some embodiments, the following factors may be included in route selection: 1) use least open switches to select route, or 2) use the number of switches in the path, or 3) use a custom priority configuration, etc. Failure modes can also be considered. If a higher priority path having a lower priority number is unable to connect, the power system may revert to the next lower priority path having a higher priority number assuming other conditions allow for the route to be activated (e.g., connection of the route does not create any source or operational mode conflicts).

The load bus router(s) may also resolve conflicts that can occur. In general, conflicts are resolved by a clear definition of priorities. Sources have priorities, loads have priorities, routes can have priorities (e.g., the route priority number if redundant paths exist), and reasons for operating have a hierarchy of priority. In some embodiments, the load bus router may address conflicts. For example, the load bus router may inhibit loops (i.e., parallel paths) that could occur if a system has redundant routes and multiple load busses requesting routes. Some loops might be allowed for a fast overlap transition between routes.

The use of routes allows for increased control efficiency and improves the reliability of configuration and commissioning of power systems.

Section 4—Signal Flow

Figure 9:
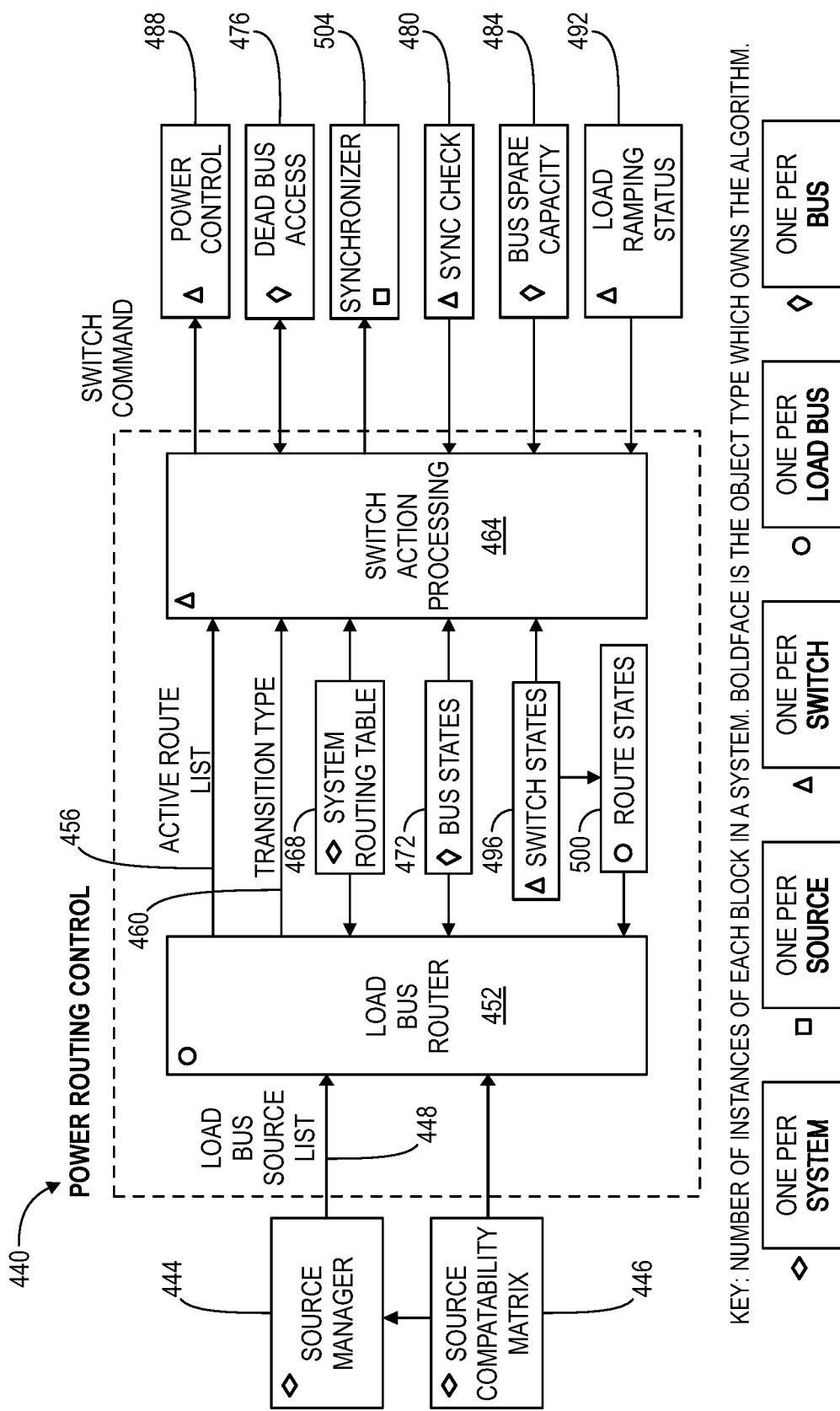
FIG. 9 is a functional logic map associated with the power system of FIG. 7 according to some embodiments.

Operation of power systems according to this disclosure identify discrete objects on a system architecture and authority for controlling operation of the system can be distributed throughout the various controllers of the power system. The specifics of distributed control will be discussed in further detail below. FIG. 9 shows a high level logic scheme 440 for controlling power delivery from the source objects to load bus objects using route level functions to control the route pathways discussed above. As used herein, the phrase "route level function" refers to functions performed by objects of a power system to achieve coordinated functionality of the power system. Route level functions of each object are discussed in further detail below. In general, a source manager is tasked with indicating to the load bus router which sources should be connected to the load bus(es). The load bus router activates and deactivates routes to the indicated sources. A switch action processing function decides for each switch whether to open, close, or do nothing depending on the routes that are active or inactive. The following description refers to functional blocks (e.g., route level functions) that interact to enact control of the power system.

As shown in FIG. 9, a source manager 444 is responsible for monitoring the status of all sources, selecting sources, and insuring there is adequate capacity. One of the primary outputs of the source manager 444 is a load bus source list 448 which lists the sources that should be connected to the load bus (i.e. a desired source connection list). A source compatibility matrix 446 defines what types of transitions are allowed between two sources, and effectively which sources can be paralleled. For example, a system with N sources, there are ½*(N^2−N) combinations for which to define compatibility. The source compatibility matrix 446 is used by both the source manager 444 and a load bus router 452. In some embodiments, the source manager 444 uses the source compatibility matrix 446 to avoid selecting source combinations that are not allowed.

If load bus source list 448 does not match the currently connected sources (or those sources expected to be connected) to the load bus, the load bus router 452 diagnoses the difference and determines the next step in the sequence toward getting the currently connected sources to match the load bus source list 448. There are several possible scenarios under which the currently connected sources and the load bus source list 448 do not match. For example: 1) a source has failed and is being replaced with a different source; 2) extra capacity is needed, so a source is being added; or 3) a test transfer with load was initiated. Once the next step is determined, the load bus router 452 updates two primary outputs, an active route list 456 and a transition type 460. The active route list 456 contains only those routes that should be connected (i.e. the desired routes). The transition type 460 is received by a switch action processing function 464 which then determines any changes to the active route list 456 that are required based on the transition type 460. Values of the transition type 460 include: None, Open Transition, Hard Closed Transition, Soft Closed Transition, or Extended Parallel. In some embodiments, one switch action processing function 464 lives in each switch controller. In some embodiments, there can be multiple instances of the switch action processing function 464 (e.g., one per switch object, multiple per controller object, etc.), so that in total there exists one instance of the switch action processing function 464 per switch in the system. Additionally, in some embodiments, the load bus router 452 uses the source compatibility matrix 446 when a complete source transfer is being requested. The load bus router 452 checks the source compatibility matrix 446 for all involved combinations of sources and will select the lowest common denominator for the transition type. In some embodiments, the source manager 444 can override the source compatibility matrix 446 result and pick a lesser transition type via a reason output signal. The options for source compatibility matrix 446 settings can include: OT=Open Transition–sources cannot be paralleled; HCT=Hard Closed Transition–sources can only be paralleled for<100 ms; SCT=Soft Closed Transition–sources can be paralleled to accomplish ramped load transfer (max parallel time applies); and/or EP=Extended Parallel–sources can be paralleled indefinitely. Other options or details of the settings may be changed depending on system implementation.

Based on the active route list 456, the switch action processing function 464 decides whether an associated switch should close, open, or remain in its current state. The switch action processing function 464 knows which routes it "lives" on (i.e. which routes the switch is a part of) which it gets from a system routing table 468.

When the switch action processing function 464 determines that a switch should close the switch action processing function 464 first determines if the switch is positioned on an active route and currently open. If the switch is on an active route and open, then the switch action processing function 464 needs to take appropriate action to get the switch safely closed. A bus state 472 on each side of the switch determines what is possible. Closure can happen only under conditions of the bus states 472 of Available-Dead, Available-Available or Dead-Dead. Once the bus state 472 conditions are met, further conditions are required such as: getting exclusive dead bus closing permission 476, meeting sync check conditions 480, and checking for adequate upstream capacity 484 to support downstream load. Once the conditions are in place, the switch is requested to close and the mechanism specific logic (e.g. an automatic transfer switch (ATS), a breaker, a contactor, etc.) in a power switch control 488 acts to close the switch.

When the switch action processing function 464 determines that a switch should open the switch action processing function 464 first determines if the switch is closed and is not positioned on any active routes. If the transition type 456 is Extended Parallel or Soft Closed Transition, the switch is commanded to open via the power switch control 488 after a load ramping status 492 indicates that the load through the switch has completed ramping off. If the transition type 456 is Hard Closed Transition or Open Transition, the switch is immediately commanded to open.

A switch state 496 is determined by a switch state algorithm. Possible switch state 496 value include: Unknown, Open, Unable to Open, Closed, and Unable to Close. The switch state 496 is used in combination with the active route list 456 and the system routing table 468 by the switch action processing function 464 to determine whether to attempt to open, close or to do nothing with the switch.

A route state 500 of each route is determined by a route state algorithm. Possible route states 500 include: Unknown, Disconnected, Unable to Disconnect, Connected, Unable to Connect. The route state 500 is used by the load bus router 452 to select viable routes. If a route is Unable to Connect, the load bus router 452 will choose the next highest priority route if one is available.

A synchronizer function 504 lives in or is allocated to sources which have the capability to adjust their voltage, frequency, and phase angle output in order to match that of another source (e.g., a genset). The switch action processing 464 will request this function when attempting to close between two Live/Available sources.

Section 5.1—Controllers

Figure 10:
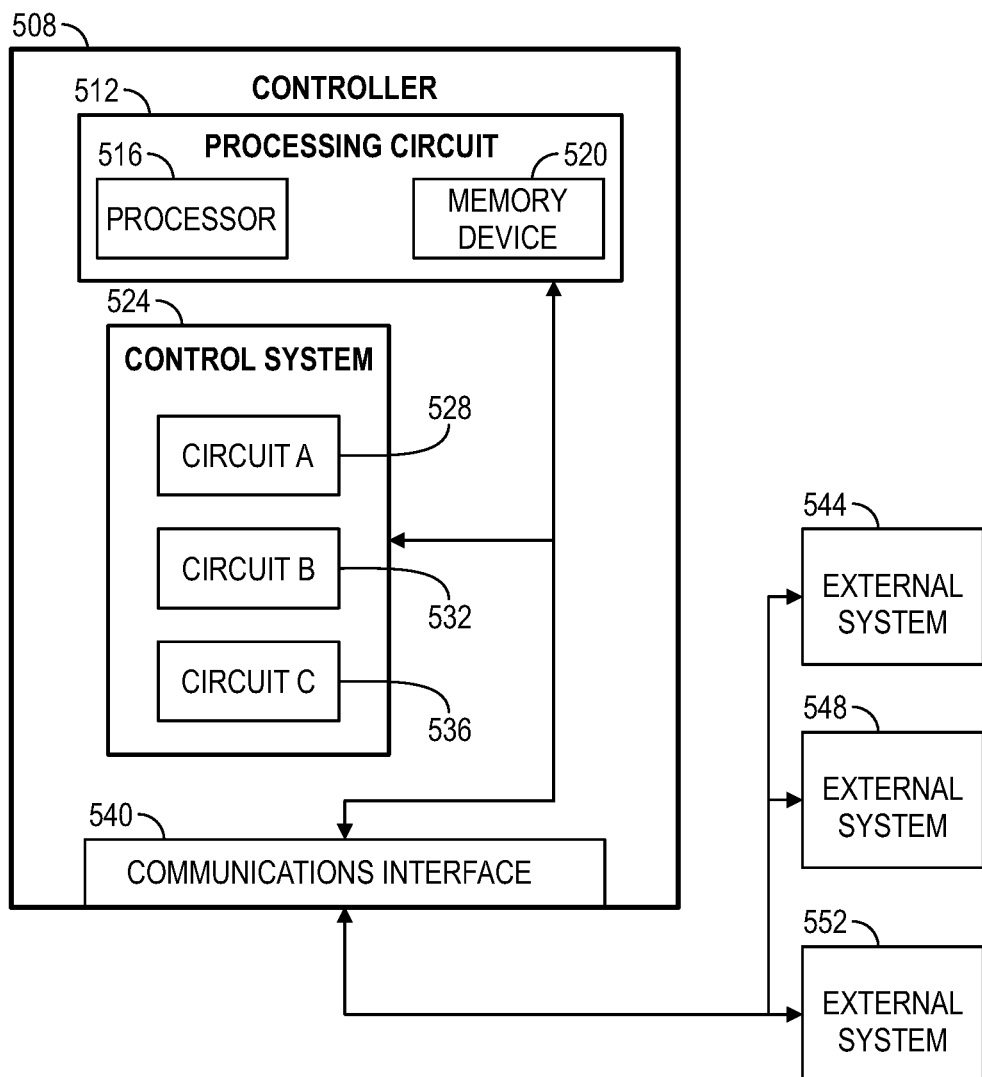
FIG. 10 is a schematic diagram of a controller according to some embodiments.

As shown in FIG. 10, a controller 508 represents a controller that is used by a power system within the control scheme 440. The controller 508 may be separate from or included with at least one other controller in a power system. As discussed farther below, control distributions schemes contemplated herein allow computing power, redundancy, and general control computations to be executed within a single controller circuit, or shared across multiple controllers within the power system. The function and structure of the controller 508 is described in greater detail in FIG. 10.

Referring now to FIG. 10, a schematic diagram of the controller 508 is shown according to an example embodiment. As shown in FIG. 10, the controller 508 includes a processing circuit 512 having a processor 516 and a memory device 520, a control system 524 having a circuit A 528, a circuit B 532, and a circuit C 536, and a communications interface 540. Generally, the controller 508 is structured to control operation of an associated object and to act within the larger power routing control scheme 440.

In one configuration, the circuit A 528, the circuit B 532, and the circuit C 536 are embodied as machine or computer-readable media that is executable by a processor, such as processor 516. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the circuit A 528, the circuit B 532, and the circuit C 536 are embodied as hardware units, such as electronic control units. As such, the circuit A 528, the circuit B 532, and the circuit C 536 may be embodied as one or more circuitry components including, but not limited to, processing circuitry, network interfaces, peripheral devices, input devices, output devices, sensors, etc. In some embodiments, the circuit A 528, the circuit B 532, and the circuit C 536 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the circuit A 528, the circuit B 532, and the circuit C 536 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The circuit A 528, the circuit B 532, and the circuit C 536 may also include programmable hardware devices such as field programmable gate arrays, programmable array logic, programmable logic devices or the like. The circuit A 528, the circuit B 532, and the circuit C 536 may include one or more memory devices for storing instructions that are executable by the processor(s) of the circuit A 528, the circuit B 532, and the circuit C 536. The one or more memory devices and processor(s) may have the same definition as provided below with respect to the memory device 520 and processor 516. In some hardware unit configurations, the circuit A 528, the circuit B 532, and the circuit C 536 may be geographically dispersed throughout separate locations in the power system. Alternatively and as shown, the circuit A 528, the circuit B 532, and the circuit C 536 may be embodied in or within a single unit/housing, which is shown as the controller 508.

In the example shown, the controller 508 includes the processing circuit 512 having the processor 516 and the memory device 520. The processing circuit 512 may be structured or configured to execute or implement the instructions, commands, and/or control processes described herein with respect to circuit A 528, the circuit B 532, and the circuit C 536. The depicted configuration represents the circuit A 528, the circuit B 532, and the circuit C 536 as machine or computer-readable media. However, as mentioned above, this illustration is not meant to be limiting as the present disclosure contemplates other embodiments where the circuit A 528, the circuit B 532, and the circuit C 536, or at least one circuit of the circuit A 528, the circuit B 532, and the circuit C 536, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 516) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., circuit A 528, the circuit B 532, and the circuit C 536 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 520 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 520 may be communicably connected to the processor 516 to provide computer code or instructions to the processor 516 for executing at least some of the processes described herein. Moreover, the memory device 520 may be or include tangible, non-transient volatile memory or non-volatile memory. Accordingly, the memory device 520 may include database components, object code components, script components, or any other type of information structure for supporting the various activities and information structures described herein.

The circuit A 528 is responsible for operation of an associated machine or object 544. For example, the circuit A 528 may control operation of a genset, an aftertreatment system, a battery bank, a switch, or any other object type. Control actions determined by the circuit A 528 are communicated to the object 544 via the communications interface 540.

The circuit B 532 is responsible for determining object control allocated to the circuit B 532. In power systems that utilize distributed control, the circuit B 532 may be in communication with other controllers 548 and/or sensors 552 to determine what objects fall under the direction and control of the controller 508.

The circuit C 536 is responsible for enacting the power routing control 440 and communicates with external systems via the communication interface 540 to activate/deactivate routes and complete the other actions of the power routing control scheme 440.

While various circuits with particular functionality are shown in FIGS. 9 and 10, it should be understood that the controller 508 may include any number of circuits for completing the functions described herein. For example, the activities and functionalities of the circuit A 528, the circuit B 532, and the circuit C 536 may be combined in multiple circuits or as a single circuit. Additional circuits with additional functionality may also be included. Further, the controller 508 may further control other activity beyond the scope of the present disclosure. In some embodiments, the circuits described herein may include one or more processing circuits comprising one or more memory devices coupled to one or more processors, the one or more memory devices configured to store instructions thereon that, when executed by the one or more processors, cause the one or more processors to perform the operations performed herein and described with reference to circuits.

As mentioned above and in one configuration, the "circuits" may be implemented in machine-readable medium for execution by various types of processors, such as the processor 516 of FIG. 10. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Section 5.2—Controller Allocation

Controllers are typically dedicated to one machine. In some cases they may support multiple machines. One concept contemplated herein is for each power system object instance in a power system to be "owned" by a controller, typically the one most directly associated with the object (i.e. has some IO associated with the object). In some cases, an object will have a copy or a duplicate control running in multiple controllers and providing redundancy using a floating principal model of distributed control for functions that need principal control.

The object model discussed above enables application flexibility. For some power systems there will be more than one way to assign controllers to objects. This may be by conscious choice in the design of the power system, or due to the machines involved. In some embodiments, one controller could perhaps handle four switches if no load monitoring was required for each load, otherwise it may require one controller per one or two switches.

In a classic ATS+Genset system, there are two controllers with object allocation as shown in FIG. 11. A power system 556 includes a utility 560 that provides grid power (e.g., provides alternating current (AC)) connected to a utility source bus 564, and a genset 568 that provides AC power to a genset bus 572. The utility source bus 564 and the genset bus 572 are connected to an automatic transfer switch (ATS) switch 576. The ATS 576 is also connected to a load bus 580. The automatic transfer switch 576 can be arranged or structured to provide power from one of the utility bus 564 or the genset bus 572 to the load bus 580. A load 584 is connected to the load bus 580 and consumes power provided by the utility 560 or the genset 568. The power system 556 also includes a genset controller 588 and a switch controller 592. The genset controller 588 is primarily associated with the genset 568 and controls the operation of the genset 568. The switch controller 592 is primarily associated with the ATS 576.

As shown in FIG. 12, the objects of the power system 556 are allocated to either the genset controller 588, the ATS controller 592, or both. The only allocation overlap in the power system 556 is on the genset bus 572 (BG1). The overlap occurs because both the genset controller 588 (C1)

and the ATS controller 592 (C2) have sensing of the genset bus 572 (BG1). Therefore, the object based power routing control schemes discussed above would be implemented for the genset 568 and the genset bus 572 on the genset controller 588, and the object based power routing control schemes would be implemented for the remaining objects on the ATS controller 592.

As shown in FIG. 13, a breaker-based, single transfer pair, single genset power system 596 includes a utility 600 that provides grid power (e.g., provides alternating current (AC)) connected to a utility source bus 604, and a genset 608 that provides AC power to a genset bus 612. The utility source bus 604 is connected to a utility source breaker 616 and the genset bus 612 is connected to a genset breaker 620. Breakers are a switch type object. The utility source breaker 616 and the genset switch 620 are connected to a load bus 624, and a load 628 is connected to the load bus 624. A single controller 632 (e.g., a genset controller) manages the whole power system 596 and thus has all the 10 necessary to interface to all five power system objects and will own all the functions related to those objects as shown in the allocation chart of FIG. 16.

Figures 15, 16:
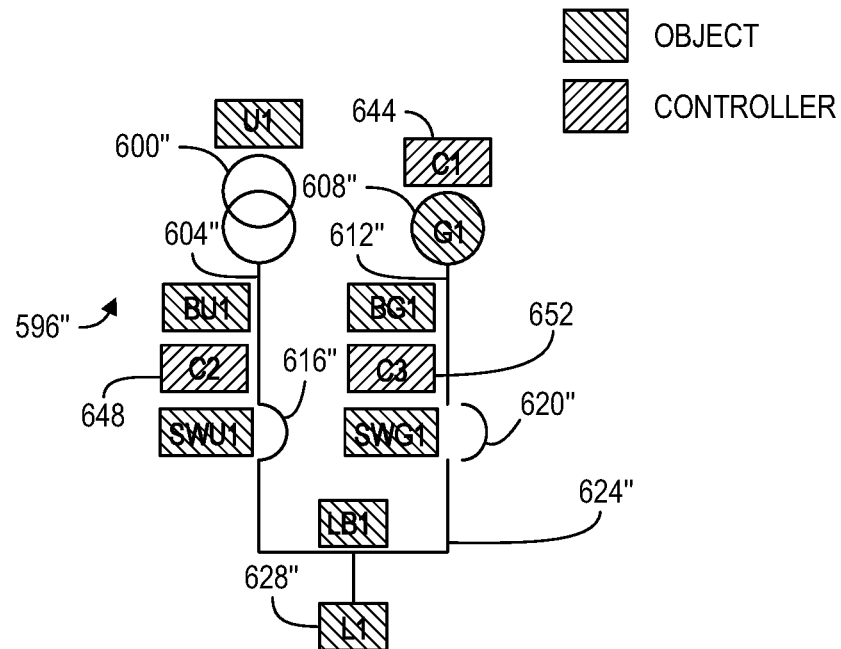
FIG. 15 is a schematic diagram of a power system according to some embodiments.
FIG. 16 is an allocation table associated with the power systems of FIGS. 13-15 according to some embodiments.

As shown in FIG. 14, a power system 596' is similar to the power system 596 of FIG. 13 and is labeled with components in prime numbers. The power system 596' includes two controllers, a genset controller 636 and a utility breaker controller 640. This may come about because the utility breaker 616' is located far away from the genset 608' and the genset breaker 620'. One advantage of the power system 596' is that the state of the load bus 624 (LB1) can be known and measured. As shown in FIG. 16, the genset 608', the genset breaker 620', the load bus 624', the genset bus 612', and the load 628' are allocated to the genset controller 636. The utility 600', the utility breaker 616', the load bus 624', the utility bus 604', and the load 628' are allocated to the utility breaker controller 640.

As shown in FIG. 15, a power system 596" is similar to the power system 596 of FIG. 13 and is labeled with components in double prime numbers. The power system 596" includes three controllers, a genset controller 644, a utility breaker controller 648, and a genset breaker controller 652. This arrangement may be desirable because the utility breaker 616" and genset breaker 620" are located far away from the genset 608" and one another. As shown in FIG. 16, the genset 608" and the genset bus 612" are allocated to the genset controller 636. The utility 600", the utility breaker 61"', the load bus 624", the utility bus 604", and the load 628" are allocated to the utility breaker controller 648. The genset breaker 620", the load bus 624", the genset bus 612", and the load 628" are allocated to the genset breaker controller 652.

Figure 17:
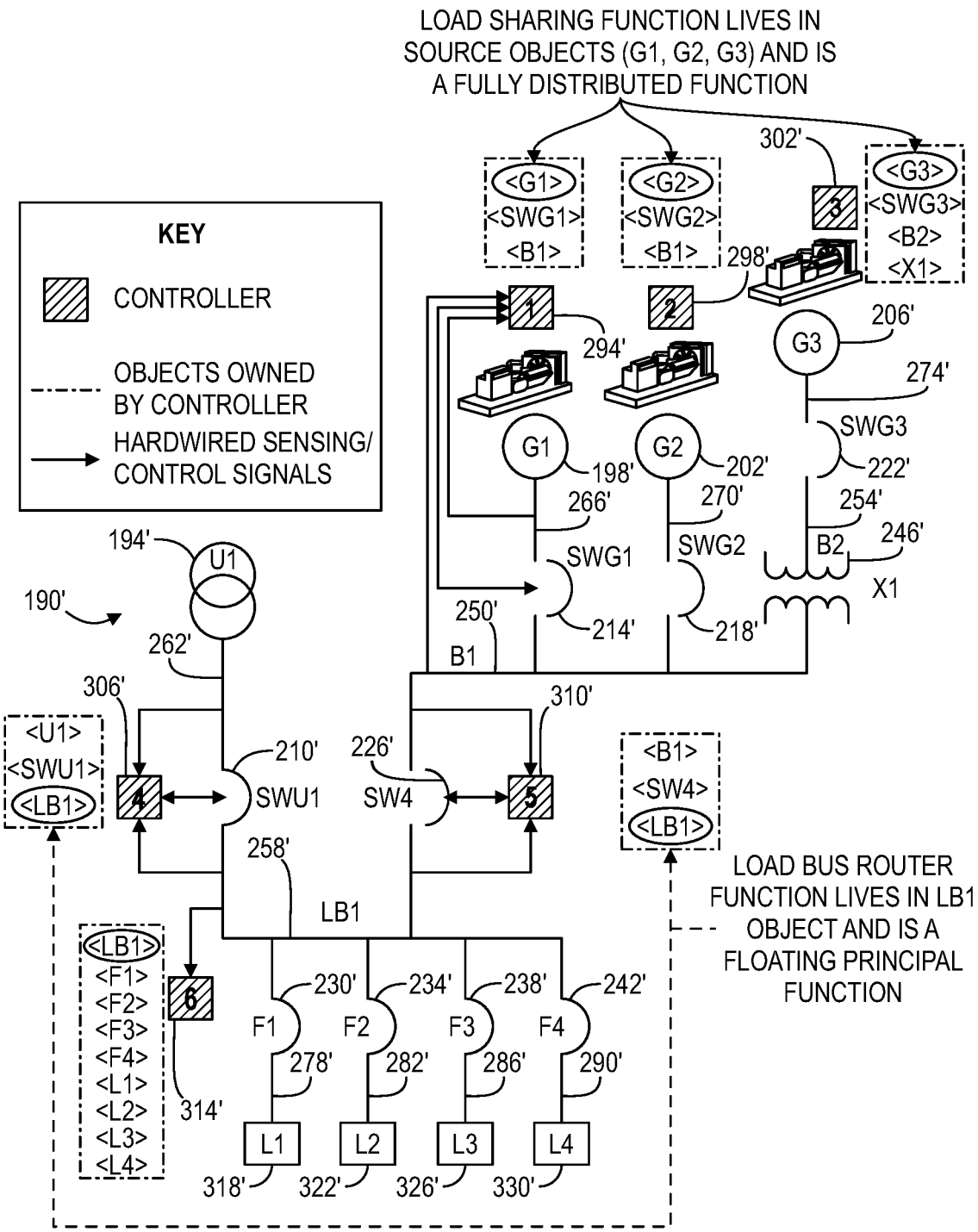
FIG. 17 is a schematic diagram of a power system according to some embodiments.

As shown in FIG. 17, a power system 190' similar to the power system 190 discussed above with respect to FIG. 4 is shown and labeled with objects in the prime series. FIG. 17 also illustrates the allocation of objects to each controller 294', 298', 302', 306', 310', 314' in addition to illustrating communication pathways. For example, the first genset controller 294' receives information from the genset branch bus 250', the first genset bus 266', and the first genset switch 214', and also provides information or control signals to the first genset switch 214'. Communication arrows are not provided for the second genset controller 298' and the third genset controller 302' to provide better clarity of the figure. FIG. 17 also shows how the load bus router function is shared between the utility switch controller 306', the genset branch switch controller 310', and the load bus controller 314'. Similarly, FIG. 17 shows that the load sharing function is distributed between the first genset controller 294', the second genset controller 298', and the third genset controller 302'. FIG. 18 shows the allocation of objects in the power system 190'.

Section 5.3—Object and Functional Realization

There are different methods that can be used to realize the objects in the controllers of the power systems discussed above. A power system object within this disclosure is a container for functionality related to that object that operates at the level of power system control.

One method of object realization includes an embedded software application for a controller that is hard-coded (e.g., compiled) with a fixed (e.g., a maximum) number of each type of object along with a full set of functions that each object contains. For example, a controller could support up to two source objects, three bus objects, two switch objects, and two load objects. In some embodiments, a controller could support or be associated with more or less objects. The available object options can be left unused if desired. For example, some installations may not require the maximum number of available objects. Which of the available object instances in a controller were used would be set at commissioning or configuration time.

In another method, a controller has a more sophisticated operating system and can instantiate objects at run time only as needed.

The object based approach allows for improved activation and configuration via a setup tool. The controllers with a power system all include the same object/functional software code which is then configured to define which objects/functions are needed, which objects a controller is responsible for (i.e., allocation), where the objects lie in the system one-line topology (i.e., the route map or table), and some further user tailoring of behavior via various other settings (e.g., power output of a source, time limitations, capacity, etc.). A computer-based setup tool can be used to define and configure the power system. The setup tool can include a palette library of all possible system objects and their variants. The user selects the objects from the library, drags them onto the drawing area and draws up the one-line topology for their power system. Once the user has drawn the power system and included where the controllers are located, each object is given an identity and other relevant settings by the user. The setup tool is then able to derive the system routing table. Once the system routing table is generated, the setup tool connects into a power system network that the controllers are on and sends the configuration data to each of the controllers. Once the configuration data is uploaded to the controllers, the one-line topology and object based control is initiated.

In this scheme, the object-oriented approach is used in the tool to draw the one-line topology, set all the needed attributes for each object, and then automatically connect to the system and download the appropriate settings to all controllers from a single point of connection. The tool includes a palette library of all the supported power system objects.

In typical genset and microgrid controls, genset scheduling, power routing, transfer control, and load shed are typically hand coded into the controllers during design and configuration simulation by highly trained and experienced personnel, often requiring extensive testing to confirm proper operation of the microgrid and sequencing for system stability. Designs can often not be repurposed to other sites or implementations and any later changes or updates to the microgrid system can also require the same level of design and testing, leading to difficulty in programming, configuration, and a lack of system redundancy.

The tool proposes attributes for each object and allows alteration of the attributes by the user/designer. The tool automatically connects to the system and downloads the appropriate settings to all controllers from a single point of connection to the microgrid so that there is no need to go system to system hand configuring controllers. The tool supports the commissioning process and simulation and/or testing of the resulting design.

Section 6.1—Centralized Control

The power systems discussed above operate on an object based framework that provides communication and cooperation between objects to implement an elegant control scheme that improves the ease and reliability of commissioning. In this section, various control schemes are discussed that can be implemented within the framework of the power systems discussed above.

Figure 19:
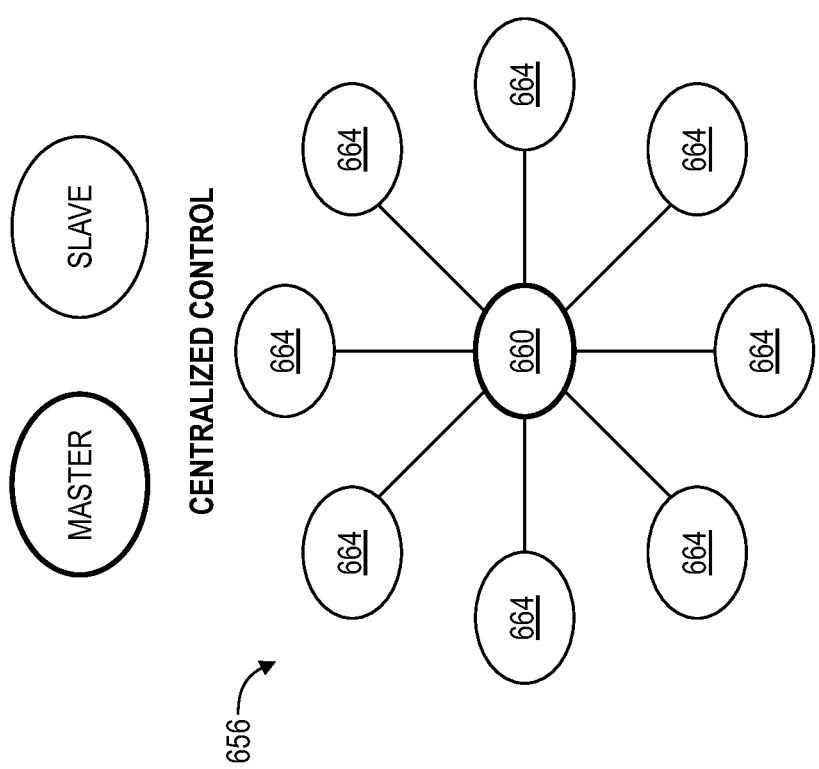
FIG. 19 is a schematic diagram of a centralized control scheme according to some embodiments.

As shown in FIG. 19, a centralized control scheme 656 includes one controller, traditionally called the master controller 660 that is responsible for telling other controllers 664 what to do. The other controllers 664 are traditionally called slave controllers. The master controller 660 will collect all necessary inputs from the other controllers 664 and itself, then run its algorithm (e.g., functions) and produce outputs which then direct the actions of the other controllers 664. The operation of the power system is entirely dependent on the master controller 660.

Figure 20:
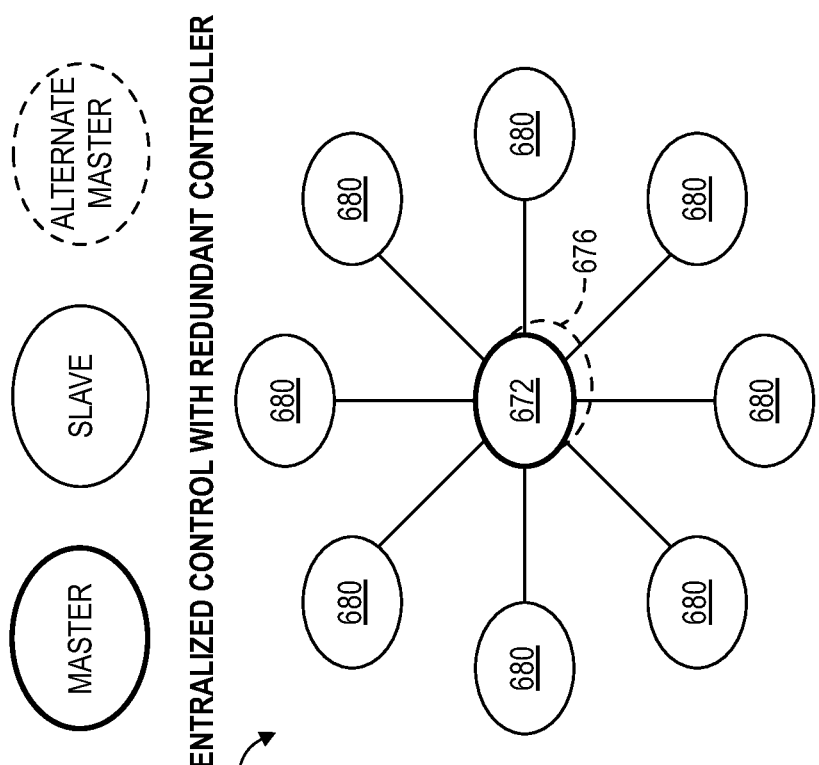
FIG. 20 is a schematic diagram of a centralized control with redundant controller scheme according to some embodiments.

As shown in FIG. 20, a centralized control with redundant controller scheme 668 includes a master controller 672 and a backup master controller 676 is added to provide redundancy in case the master controller 672 fails. Typically, both the master controller 672 and the backup 676 execute the same code concurrently and function to check each other. One is designated the primary master 672 and the other is the secondary master 676. If the primary master 672 fails, the secondary master 676 will immediately step in and take over control of other controllers 680. This method can eliminate the single-point failure vulnerability of the centralized control scheme 656.

In FIGS. 19 and 20, the lines connecting master and slave controllers indicate that only the master has any communication with the slaves. The slave controllers do not communicate with one another. Communication can include the transfer of information and/or signals over a hardwired architecture, using communications links, or another communication system.

Section 6.2—Distributed Control

Distributed control within this disclosure refers to a control scheme that does not rely on a single controller for the operation of the entire power system. That is, loss of a single controller, while possibly causing degraded operation of the power system, will not render the power system completely inoperable. FIGS. 21-25 depict three distributed control schemes that together with the object based approach can build a robust and redundant distributed control power system.

Section 6.3—Floating Principal Control

Figure 21:
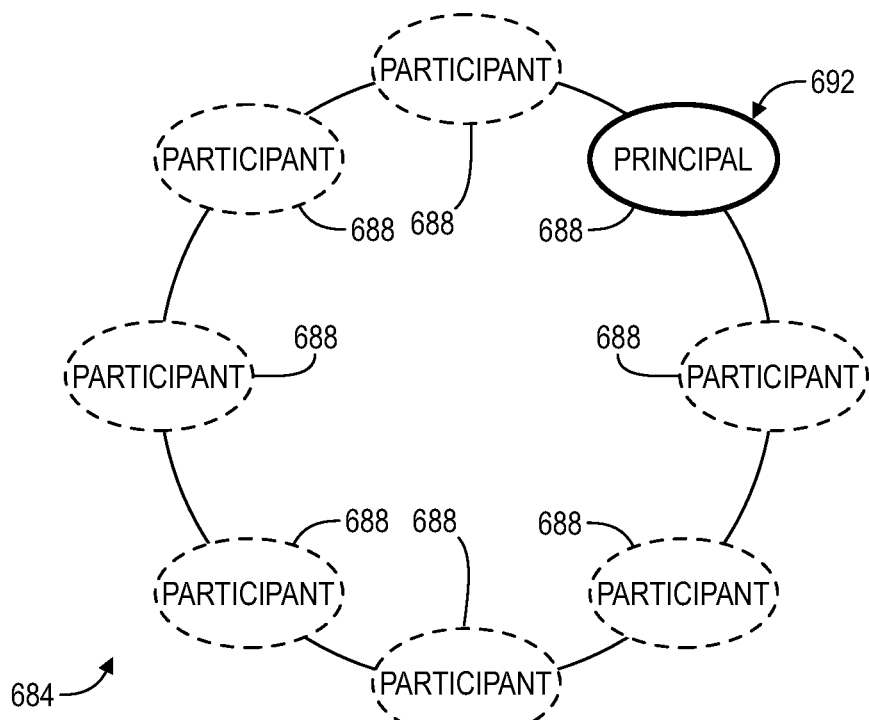
FIG. 21 is a schematic diagram of a floating principal control scheme according to some embodiments.

As shown in FIG. 21, a floating principal control scheme 684 includes multiple controllers 688 that are each capable of performing a particular system function, but the function is such that it needs to be performed by only one "brain" or action controller at any given time. That is, there exists a form of what one might call centralized control, if only virtually for individual tasks or functions. The action controller that is currently in the role of performing the function is called the principal controller 692. The other controllers 688 which are capable, but not currently the active principal controller 692 are called participant controllers. If at any time the principal controller 692 fails or is otherwise unable to perform its duties for the power system, one of the participant controllers seamlessly steps in and takes over the role of principal controller 692. This behavior is described as a floating principal in that the principal can float to any controller 688 capable of that function.

Each controller 688 currently in the role of participant for a particular system function has three options for how to handle the system function. First, it can refuse to execute the function and only start running the function when the controller 688 becomes the principal controller 692. Execution refusal is done if there is no need for seamlessness when the controller 688 takes on the role of principal controller 692. Second, the controller 688 can asynchronously (to the current principal controller 692) run the function and compute outputs even though its outputs are not being used at present. In asynchronous operation, if the controller 688 becomes the principal controller 692, the controller 688 will typically be within an execution iteration of being in the same state with the same outputs as the former principal controller 692. Third, the controller 688 can operate lock-step in synchronicity with the principal controller 692 so that any take-over is completely seamless.

Figure 22:
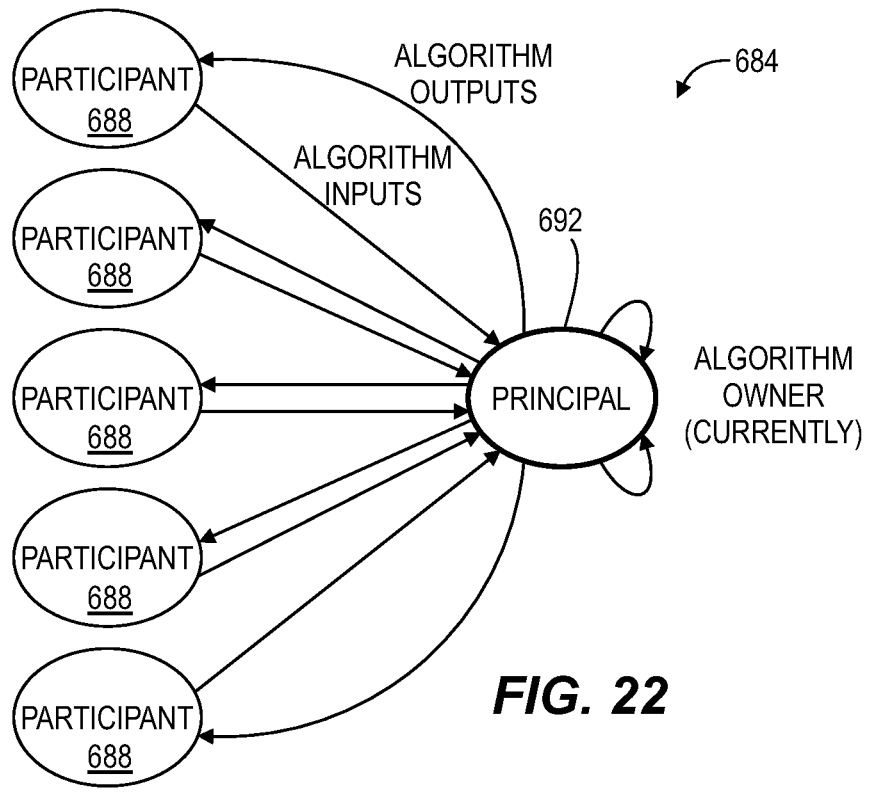
FIG. 22 is a schematic diagram of the floating principal control scheme of FIG. 21 according to some embodiments.

As shown in FIG. 22, the current principal controller 692 collects all inputs from all the participant controllers 688 and itself. Then the principal controller 692 computes outputs/commands for delivery to all participant controllers 688 and itself. Each participant controller 688 may be doing exactly the same thing as the principal controller 692, except the algorithm outputs of the participant controllers 688 are not being used.

Selection of the principal controller 692 can be determined automatically between the controllers in the power system. In some embodiments, each controller 688 includes a unique controller or object ID and the controller 688 with the lowest object ID number is the chosen as the principal controller 692.

Section 6.4—Fully Distributed Control

Figure 23:
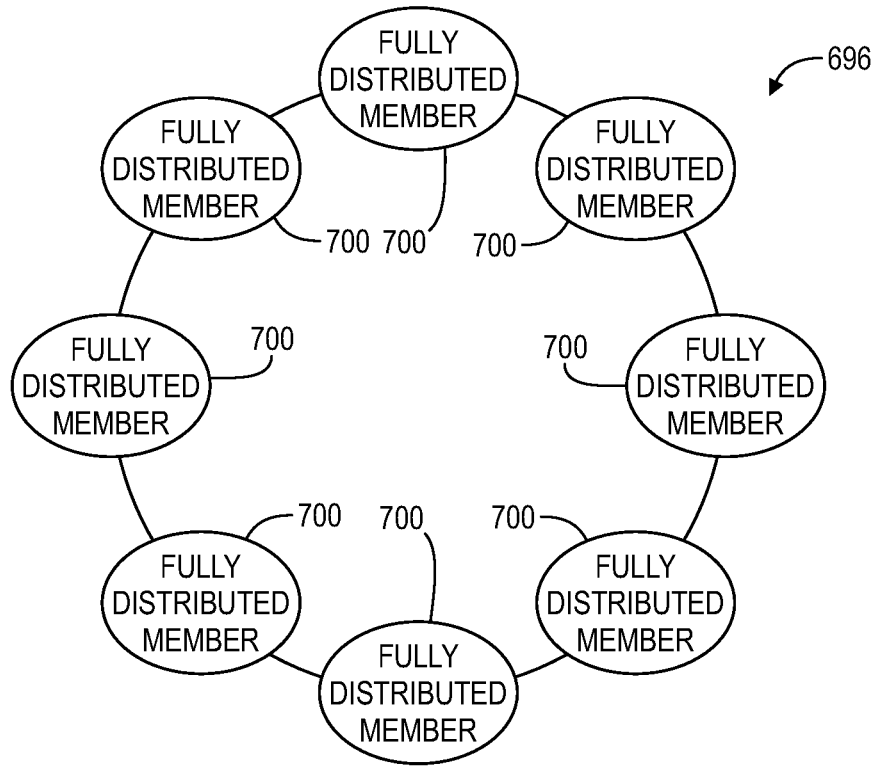
FIG. 23 is a schematic diagram of a fully distributed control scheme according to some embodiments.

Some power system functions lend themselves to a fully distributed model of control rather than principal/participant. As shown in FIG. 23, in a fully distributed control scheme 696, all controllers 700 that perform a particular system function are equals. One characteristic that makes them fully distributed is that each controller 700 determines its own action to take, rather than determining it also for others as in the case of a principal controller in the floating principal control scheme 684. The fully distributed control scheme 696 may also be called a self-determination approach.

Figure 24:
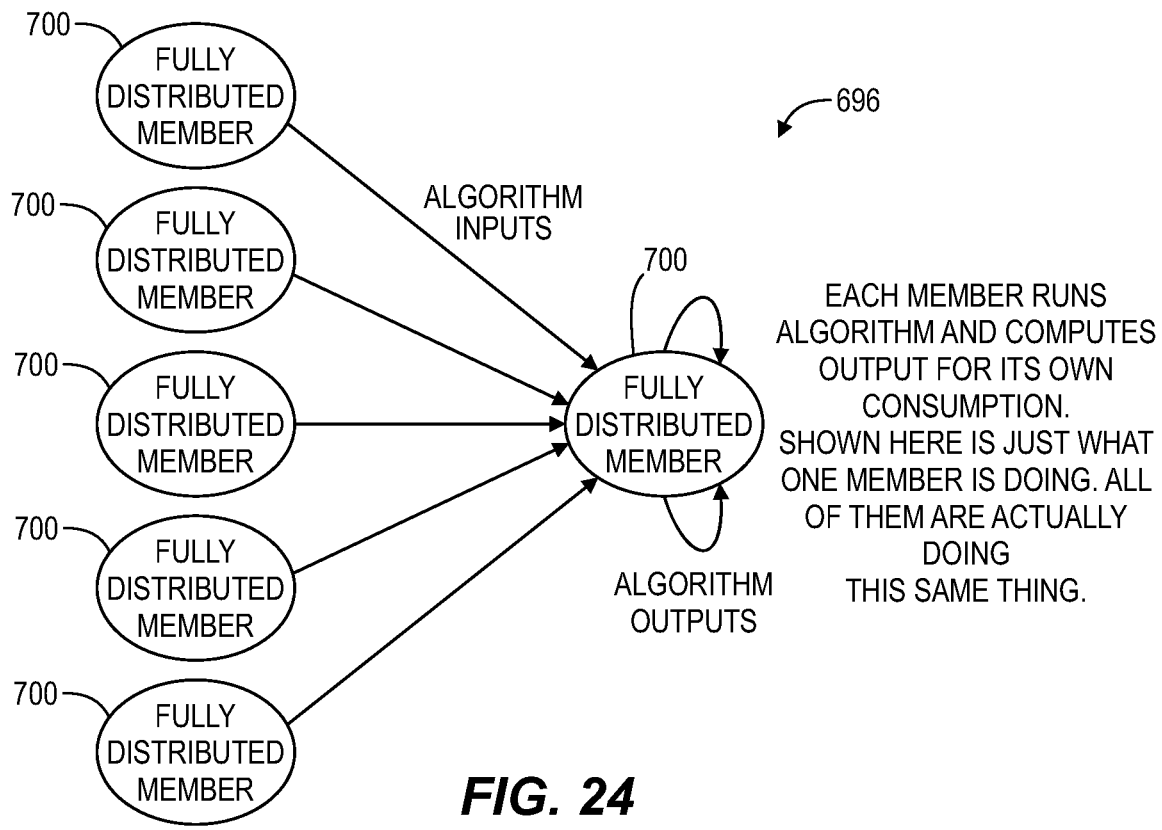
FIG. 24 is a schematic diagram of the fully distributed control scheme of FIG. 23 according to some embodiments.

As shown in FIG. 24, the generalized case of information flow for the fully distributed control scheme 696 provides that each controller 700 collects all the inputs needed and computes only the command/output for itself. FIG. 24 shows only what a single controller 700 is doing, but each controller 700 is computing simultaneously.

Section 6.5—Redundant Control

Figure 25:
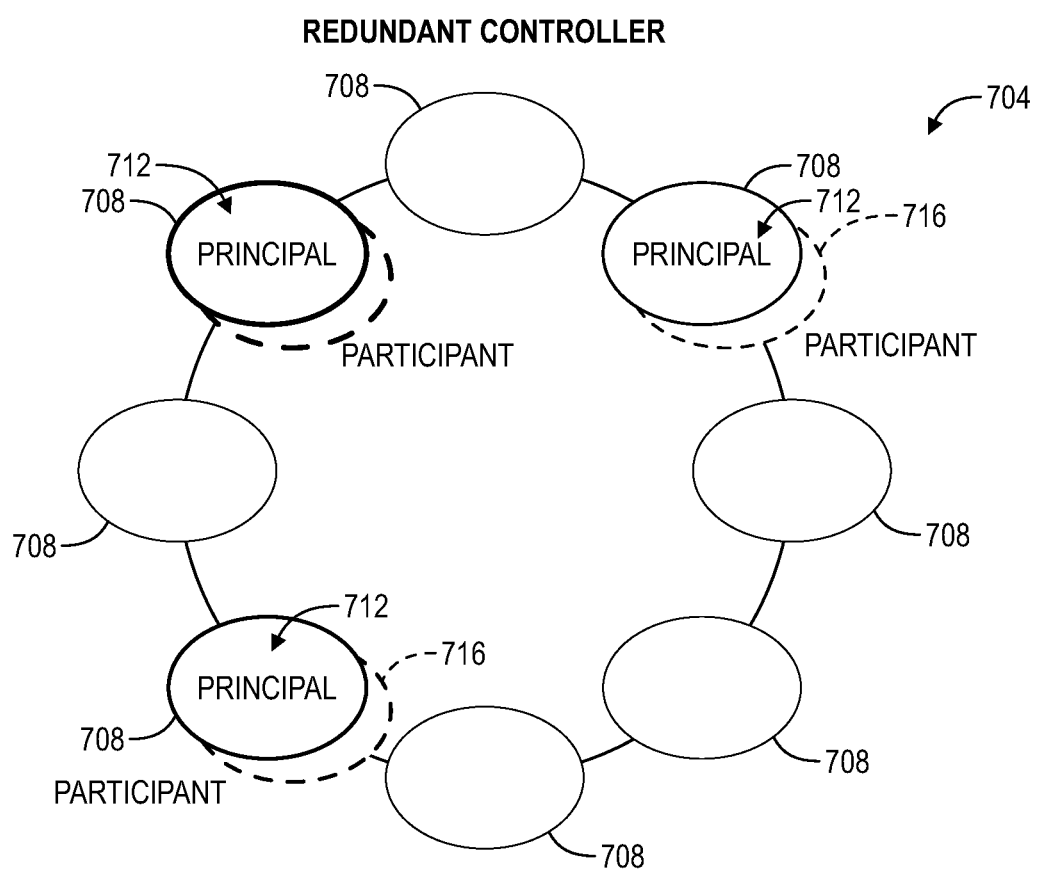
FIG. 25 is a schematic diagram of a redundant controllers floating principal scheme according to some embodiments.

While the floating principal control scheme 684 and the fully distributed control scheme 696 do reduce the impact of single-point controller failures on the power system control in many scenarios, there is still the possibility that loss of a single controller can cause a significant impact on the functioning of the power system. As shown in FIG. 25, a redundant floating principal scheme 704 includes multiple controllers 708, each capable of acting as a principal controller 712. In addition, redundant controllers 716 are installed at key locations in the power system topology. A scheme similar to the floating principal control scheme 684 is then used to decide which controller 708 or redundant controller 716 is currently acting as a principal controller 712.

In FIGS. 21, 23, and 25, the lines between controllers are intended to represent that each controller communicates with all other controllers. The generally circular representation simplifies the way the system looks, but connections between each controller to every other controller are intended.

Section 6.6—Examples

Turning back to FIG. 17, the power system 190' includes bus objects that include the load bus router function which is configured as a floating principal type of function. The utility switch controller 306', the load bus controller 314', and the genset branch switch controller 310' all "own" or are allocated the load bus 258' and therefore, any of them can be the principal controller for the load bus router function of the load bus 258'. Using a scheme that selects the controller with the lowest ID to be the principal controller, the utility switch controller 306' will be identified as the principal controller.

In some embodiments, the first genset controller 294', the second genset controller 298', or the third genset controller 302' could also be available as the principal controller for the load bus router function, but the principal controller for the load bus router function would advantageously have voltage sensing of capabilities of the load bus 258'. The only controllers which have voltage sensing of the load bus 258' are the utility switch controller 306', the load bus controller 314', and the genset branch switch controller 310'. If each of those controllers failed, no other controller could do the job of executing the load bus router function. Thus, in practice, not all controllers are equal, and functions needing principal control may draw from varying subsets of all of the controllers in the power system (depending on the function).

Also shown in FIG. 17 is the load sharing function which lives in all source objects and acts in a fully distributed manner. Each of the first genset controller 294', the second genset controller 298', or the third genset controller 302' own a source object. Each of these three controllers 294', 298', 302' executes its instance of the load sharing function by consuming data from other controllers and itself, then computing the results for use by itself.

In a more specific example of the distributed control scheme, the goal of the load sharing function is to have each source equally share the load. The controller on each source publishes its current load value data. The first genset controller 294' adds all the loads together for the first genset 198', the second genset 202', and the third genset 206' and computes the average load. The first genset controller 294' then compares its current load value to the average load. If its current load is less than the average load, it is not taking enough of the load. The first genset controller 294' will then act to increase the power output of the first genset 198'. The second genset controller 298' is doing this same thing and determining its own needed correction, and the third genset controller 302' is also doing this. Thus, each is only determining its own action, not actions that others need to take.

It is possible that a fully distributed or floating principal algorithm may have multiple instances within a single controller. Referring to the above fully distributed example, a single controller might own two source objects, and thus have two separate instances of the load sharing function. This still means that each instance of the function operates in a fully distributed way even though it occurs within a single controller. Loss of that controller would result in loss of both sources.

In the case of a floating principal function having two instances within a controller, there would be two participants capable of acting as the floating principal within that one controller. If that controller failed, there would be two less participants in the pool for that function.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of power systems, objects, and control schemes as shown in the various exemplary embodiments is illustrative only. Additionally, any element disclosed in one embodiment may be incorporated or utilized with any other embodiment disclosed herein. Further, elements from one section described above (e.g., Section 1.4—Load Objects) may be incorporated or utilized with any other elements described in separate sections (e.g., Section 4—Signal Flow). For example, the object parameters and functions of the exemplary embodiment described with respect to FIG. 3 (e.g., Section 1—Objects) may be incorporated in the power systems and objects of the exemplary embodiment described with respect to FIGS. 4, 7, 9, 10, 11, 13-15, and 17 (e.g., Section 5.2—Controller Allocation). Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An apparatus, comprising:
   a circuit structured to:
      identify a first source object, a second source object, and a load bus object;
      determine locations of the first source object, the second source object, and the load bus object on a one-line topology;
      receive operational parameters of the first source object, the second source object, and the load bus object;
      define, using the one-line topology, a first route including objects electrically connected between the first source object and the load bus object;
      define, using the one-line topology, a second route including all objects electrically connected between the second source object and the load bus object; and
      control operation of the first route and the second route including generating an active route list and determining route states associated with the first route or the second route based on a switch action processing function.

2. The apparatus of claim 1, wherein the circuit is further structured to generate a route table including all available routes.

3. The apparatus of claim 1, wherein control of the first route includes selectively activating the first route by controlling closing actions of switch objects included on the first route, and deactivating the first route by controlling opening actions of at least one switch object on the first route.

4. The apparatus of claim 3, wherein activating the first route includes communicating with all objects on the first route and coordinating activation actions of each object before initiating the closing actions of the switch objects included on the first route.

5. The apparatus of claim 1, wherein defining the first route includes communication with all the objects electrically connected between the first source object and the load bus object to define inclusion on the first route within an associated control circuit.

6. The apparatus of claim 1, wherein the circuit is further structured to define, using the one-line topology, a third route different from and parallel to the first route, and including all objects electrically connected between the first source object and the load bus object along the third route.

7. The apparatus of claim 6, wherein the first route defines a first priority value and the third route defines a second priority value that is higher than the first priority value.

8. The apparatus of claim 7, wherein the first priority value is proportional to a number of switch objects included in the first route and the second priority value is proportional to a number of switch objects included in the third route.

9. The apparatus of claim 6, wherein only one of the first route and the third route are activated simultaneously during continuous use following a transition time.

10. The apparatus of claim 1, wherein the circuit is further structured to disable the second route thereby inhibiting the second route from being activated.

11. A system, comprising:
    a first genset controller associated with a first genset and a first genset switch;
    a second genset controller associated with a second genset and a second genset switch;
    a genset branch switch controller associated with a genset branch switch coupled to the first genset switch and the second genset switch via a genset branch bus;
    a utility switch controller associated with a utility switch; and
    a load bus controller associated with a load bus coupled to the genset branch switch and the utility switch,
    wherein the system is structured to generate a route table defining
       a first route including the first genset, the first genset switch, the genset branch bus, and the genset branch switch, and the load bus,
       a second route including the second genset, the second genset switch, the genset branch bus, the genset branch switch, and the load bus, and
       a third route including the utility switch and the load bus,
    wherein the system generates an active route list based on the route table and determines route states associated with the first route, the second route, and the third route based on a switch action processing function,
    wherein the system selectively activates the first route by communicating with the first genset controller, the genset branch switch controller, and the load bus controller,
    wherein the system selectively activates the second route by communicating with the second genset controller, the genset branch switch controller, and the load bus controller, and
    wherein the system selectively activates the third route by communicating with the utility switch controller and the load bus controller.

12. The system of claim 11, wherein the load bus controller includes a load bus routing function that determines which of the first route, the second route, and the third route should be activated or deactivated and provides a transition type function to each controller associated with any switch on any route to achieve activation or deactivation.

13. The system of claim 12, wherein the switch action processing function is structured to receive the transition type function from the load bus controller and control operation of the first genset and the first genset switch to achieve the activation or deactivation of the first route.

14. The system of claim 13, wherein the switch action processing function is further structured to request activation of a synchronizer function that adjusts a voltage, frequency, and phase angle of an output of the first genset before the first genset switch is closed.

15. The system of claim 13, wherein the switch action processing function is structured to communicate a switch state function to the load bus routing function, and
wherein the active route list is generated by the load bus routing function based on the switch state function.

16. A method, comprising:
generating a one-line topology of a power system including source objects, switch objects, bus objects, and controller objects;
populating each object with operational parameters;
generating a routing table defining available routes between source objects and bus objects, each route including all objects electrically connected between a source object and a bus object of the route;
generating an active route list and determining route states associated with the routing table based on a switch action processing function; and
controlling the power system by activating and deactivating routes.

17. The method of claim 16, wherein operational parameters of each object are selected from a library of object configurations.

18. The method of claim 16, wherein the active route list includes a list of routes to be activated or deactivated; and
further comprising communicating a transition type to switch objects to control activation or deactivation list of routes.

19. The method of claim 16, wherein the routing table assigns a route ID, an enable attribute, a route priority, and a route path to each route.

20. The method of claim 16, wherein each controller object is allocated to one or more of the source objects, the switch objects, and the bus objects, to enact control of the power system by activating and deactivating routes.

21. The apparatus of claim 1, wherein the circuit is further structured to control operation of the first route to control all objects residing on the first route and to control operation of the second route to control all objects residing on the second route.

22. The apparatus of claim 1, wherein the circuit is further structured to control operation of the first route and the second route including determining a first route state and a second route state, wherein route states include unknown, disconnected, unable to disconnect, connected, or unable to connect.

* * * * *